US 11,388,405 B2

(12) United States Patent
Nellore et al.

(10) Patent No.: US 11,388,405 B2
(45) Date of Patent: *Jul. 12, 2022

(54) CONTENT AWARE SCHEDULING IN A HEVC DECODER OPERATING ON A MULTI-CORE PROCESSOR PLATFORM

(71) Applicant: ARRIS Enterprises LLC, Suwanee, GA (US)

(72) Inventors: Anil Kumar Nellore, Bangalore (IN); Padmagowri Pichumani, Bangalore (IN); Vinay Kulkarni, Bangalore (IN); Chetan Kumar Viswanath Gubbi, Bangalore (IN); Shailesh Ramamurthy, Bengaluru (IN); Padmassri Chandrashekar, Bangalore (IN)

(73) Assignee: ARRIS Enterprises LLC, Suwanee, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/088,131

(22) Filed: Nov. 3, 2020

(65) Prior Publication Data
US 2021/0136384 A1 May 6, 2021

Related U.S. Application Data

(63) Continuation of application No. 14/723,573, filed on May 28, 2015, now Pat. No. 10,827,178.
(Continued)

(51) Int. Cl.
H04N 19/13 (2014.01)
H04N 19/117 (2014.01)
(Continued)

(52) U.S. Cl.
CPC ........... *H04N 19/13* (2014.11); *H04N 19/117* (2014.11); *H04N 19/17* (2014.11); *H04N 19/174* (2014.11);
(Continued)

(58) Field of Classification Search
USPC .................................................. 375/240.02
See application file for complete search history.

(56) References Cited

U.S. PATENT DOCUMENTS 10,827,178 B2 * 11/2020 Nellore ................. H04N 19/44
2008/0123972 A1   5/2008 Sekiguchi et al.
(Continued)

FOREIGN PATENT DOCUMENTS

WO    2013/107906 A2    7/2013
WO    2013/153226 A2   10/2013

OTHER PUBLICATIONS

PCT Search Report & Written Opinion, Re: Application No. PCT/US2015/032832, dated Aug. 27, 2015.
(Continued)

Primary Examiner — Christopher S Kelley
Assistant Examiner — Ana Picon-Feliciano
(74) Attorney, Agent, or Firm — Chernoff, Vilhauer, McClung & Stenzel, LLP

(57) ABSTRACT

A method is provided for decoding an encoded video stream on a processor having a plurality of processing cores includes receiving and examining a video stream to identify any macroscopic constructs present therein that support parallel processing. Decoding of the video stream is divided into a plurality of decoding functions. The plurality of decoding functions is scheduled for decoding the video stream in a dynamic manner based on availability of any macroscopic constructs that have been identified and then based on a number of bytes used to encode each block into
(Continued)

which each picture of the video stream is partitioned. Each of the decoding functions is dispatched to the plurality of processing cores in accordance with the scheduling.

14 Claims, 19 Drawing Sheets

Related U.S. Application Data

(60) Provisional application No. 62/003,695, filed on May 28, 2014.

(51) Int. Cl.
*H04N 19/176* (2014.01)
*H04N 19/174* (2014.01)
*H04N 19/44* (2014.01)
*H04N 19/17* (2014.01)
*H04N 19/436* (2014.01)
*H04N 19/186* (2014.01)
*H04N 19/82* (2014.01)

(52) U.S. Cl.
CPC ......... *H04N 19/176* (2014.11); *H04N 19/186* (2014.11); *H04N 19/436* (2014.11); *H04N 19/44* (2014.11); *H04N 19/82* (2014.11)

(56) References Cited

U.S. PATENT DOCUMENTS

| | | |
|---|---|---|
| 2009/0245349 A1 | 10/2009 | Zhao et al. |
| 2010/0080303 A1 | 4/2010 | Suzuki |
| 2011/0004881 A1 | 1/2011 | Terechko et al. |
| 2012/0183074 A1 | 7/2012 | Fuldseth |
| 2013/0101035 A1 | 4/2013 | Wang et al. |
| 2013/0202051 A1 | 8/2013 | Zhou |
| 2014/0321529 A1 | 10/2014 | Jung et al. |
| 2015/0208076 A1 | 7/2015 | Tan et al. |

OTHER PUBLICATIONS

F. Bossen, et al., "HEVC Complexity and Implementation Analysis", IEEE Transactions on Circuits and Systems for Video Technology, vol. 22, No. 12, Dec. 1, 2012, pp. 1685-1696.

C. Chi, et al., "Parallel Scalability and Efficiency of HEVC Parallelization Approaches", IEEE Transactions on Circuits and Systems for Video Technology, vol. 22, No. 12, Dec. 1, 2012, pp. 1827-1838.

\* cited by examiner

FIG. 10

CONTENT AWARE SCHEDULING IN A HEVC DECODER OPERATING ON A MULTI-CORE PROCESSOR PLATFORM

CROSS REFERENCE TO RELATED APPLICATION

This Application is a continuation of U.S. patent application Ser. No. 14/723,573 filed on May 28, 2015, now U.S. Pat. No. 10,827,178, and which claims priority under 35 U.S.C. § 119(e) from earlier filed U.S. Provisional Application Ser. No. 62/003,695, filed May 28, 2014 both of which are incorporated herein by reference in their entirety.

BACKGROUND

Video compression techniques are employed by a wide variety of video devices. Examples of such devices include digital televisions, digital direct broadcast systems, wireless broadcast systems, tablet computers, smartphones, personal digital assistants (PDAs), laptop or desktop computers, digital cameras, digital recording devices, digital media players, video gaming devices, video game consoles, cellular or satellite radio telephones, video teleconferencing devices, set-top devices, and the like. Examples of video compression techniques are described in standards such as those defined by MPEG-2, MPEG-4, ITU-T H.263, ITU-T H.264/MPEG-4, Part 10, Advanced Video Coding (AVC), the High Efficiency Video Coding (HEVC) standard, and extensions of such standards.

HEVC is based on the same structure of prior hybrid video codecs like H.264/AVC, incorporating improvements in compression techniques in each enabling technology. For instance, HEVC incorporates a prediction stage composed of motion compensation, with variable block size and fractional-pel motion vectors) as well as spatial intra-prediction. A DCT-like integer transform, along with scalar quantization, is applied to prediction residuals. Quantized coefficients are entropy encoded using CABAC (Context Adaptive Binary Arithmetic Coding). In-loop filters are applied on the reconstructed signal.

A significantly different coding structure of HEVC replaces the macroblock based coding in H.264. The new coding structure is based on coding units (CUs) that contain one or several prediction units (PUs) and transform units (TUs). PUs and TUs can each have partitions induced in them, in accordance with the compliance rules specified in the HEVC Standard HEVC coding may be performed on multi-core processors, which are widely being used to increase computational capacity beyond what can be achieved by the best clock speeds possible by a single core processor. However, exploiting multi-core processing power requires that the software solution be designed to have a high degree of parallelization. Understandably, much effort has gone into achieving parallelization during the standardization of HEVC. The HEVC standard provides features for high level parallelization such as slices, tiles and wavefronts that can help both encoders and decoders process large data in parallel. These parallelization features are all optional and hence can be turned off by the encoder.

SUMMARY

In accordance with one aspect of the invention, a method is provided for decoding an encoded video stream on a processor having a plurality of processing cores. In accordance with the method, the encoded video stream is received and examined to identify any macroscopic constructs present therein that support parallel processing. Decoding of the video stream is divided into a plurality of decoding functions. The plurality of decoding functions is scheduled for decoding the video stream in a dynamic manner based on availability of any macroscopic constructs that have been identified and then based on a number of bytes used to encode each block into which each picture of the video stream is partitioned. Each of the decoding functions is dispatched to the plurality of processing cores in accordance with the scheduling.

In accordance with one aspect of the invention, a video decoder is provided that includes a CABAC decoding component, a core video decoding component, a multicore processor, a scheduler and a dispatcher. The CABAC decoding component receives and decodes the video bitstream to obtain syntax elements. The core video decoding component performs core luma and chroma processing. Each of the core luma and chroma processing including intra prediction, motion-compensation, inverse transform, inverse quantization and inverse reconstruction processes. The multicore processor has a plurality of processing cores and the scheduler schedules. CABAC decoding and core luma and chroma processing on the plurality of processing cores based on availability of any macroscopic constructs that have been identified from the syntax elements and then based on a number of bytes used to encode each block into which each picture of the video stream is partitioned. The dispatcher dispatches the CABAC decoding and the core luma and chroma processing to the plurality of processing cores in accordance with the scheduling.

BRIEF DESCRIPTION OF THE DRAWINGS

FIG. 10 shows an illustrative frame or picture that is divided into 6 tiles of different sizes.

DETAILED DESCRIPTION

Introduction

As detailed below, a rule based framework is provided for designing a dynamic scheduling algorithm for HEVC decoding on dual core or multi-core platforms. Based on the presence or absence of the various parallelization tools as well as the intrinsic characteristics of the encoded stream like bit-rate, this framework can more efficiently distribute processing tasks across the various cores of a processor.

"Video coding" or "coding" may refer generally to either or both of video encoding, e.g., by a video encoder, or video decoding, e.g., by a video decoder. For video coding, a video coder, e.g., video encoder or video decoder, may partition a video frame or picture into a plurality of blocks, and perform a variety of operations on the blocks of video data. For example, for video coding according to the High Efficiency Video Coding (HEVC) standard presently under development, for example, a video frame may be partitioned into N×N square blocks of luma pixels and N/2×N/2 chroma pixels called coding tree blocks (CTBs). The size N of the CTBs is chosen by the encoder and may be, for example, 16, 32 or 64. The luma CTB and the two chroma CTBs, together with the associated syntax, form a coding tree unit (CTU). CTBs may be partitioned into coding blocks (CBs), prediction units (PUs), and transform units (TUs). A CTB generally refers to an image region that serves as a basic unit to which various coding tools are applied for video compression. A CTU typically has a square geometry, and may be considered to be analogous to a so-called "macroblock" as defined according to other video coding standards, such as, for example, ITU-T H.264 (H.264). In yet other coding standards such as VP8, VP9 and VP10, a superblock is analogous to a CTB.

To achieve better coding efficiency, a CB may have a variable size depending on the video data it contains. That is, a CTB may be partitioned, or "split," into smaller blocks using a quadtree structure. In addition, each CTB that is not split into CBs may be further partitioned into one or more PUs and TUs for purposes of prediction and transform of the CB, respectively.

Figure 1:
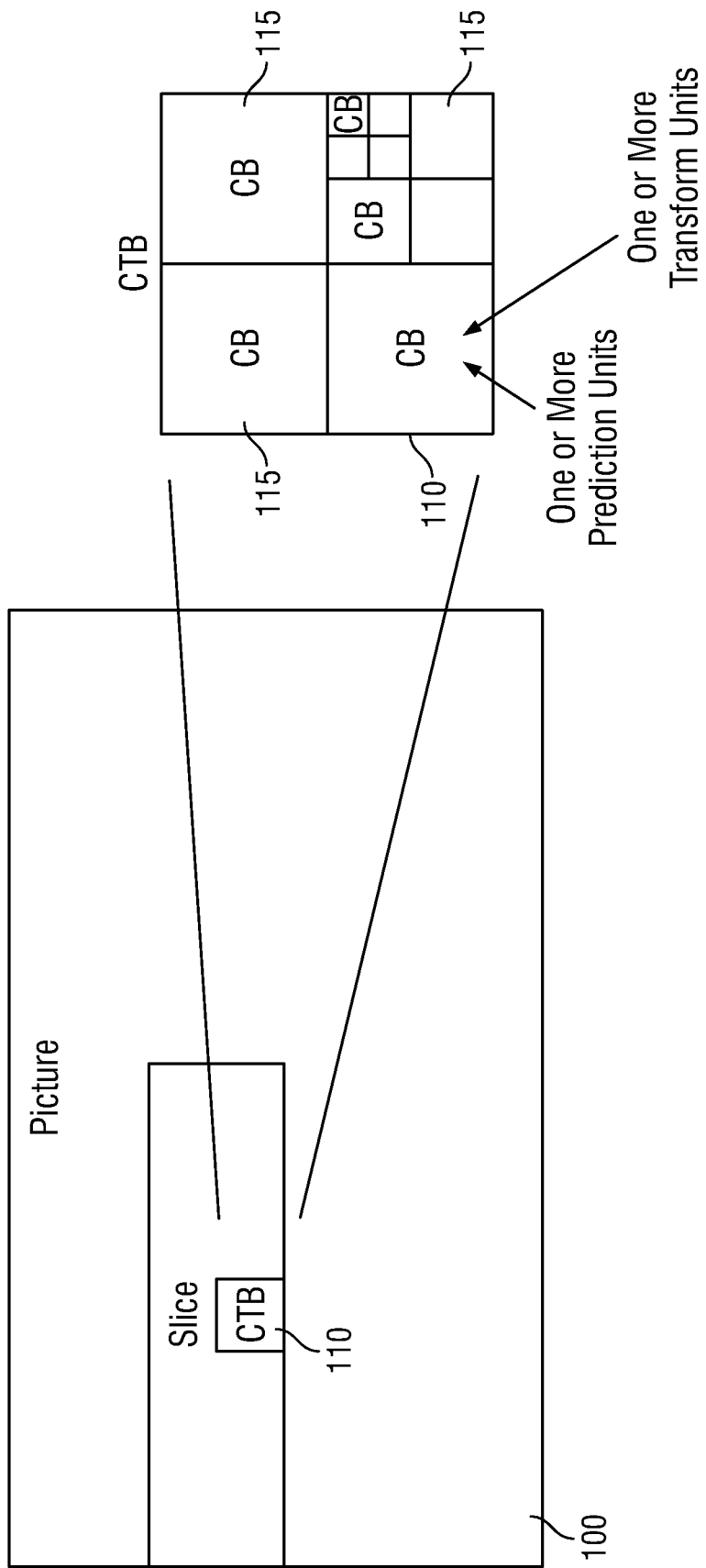
FIG. 1 shows a picture that is divided into coding tree blocks (CTBs) which are in turn divided into coding blocks (CBs) using a quadtree structure.
Figure 2:
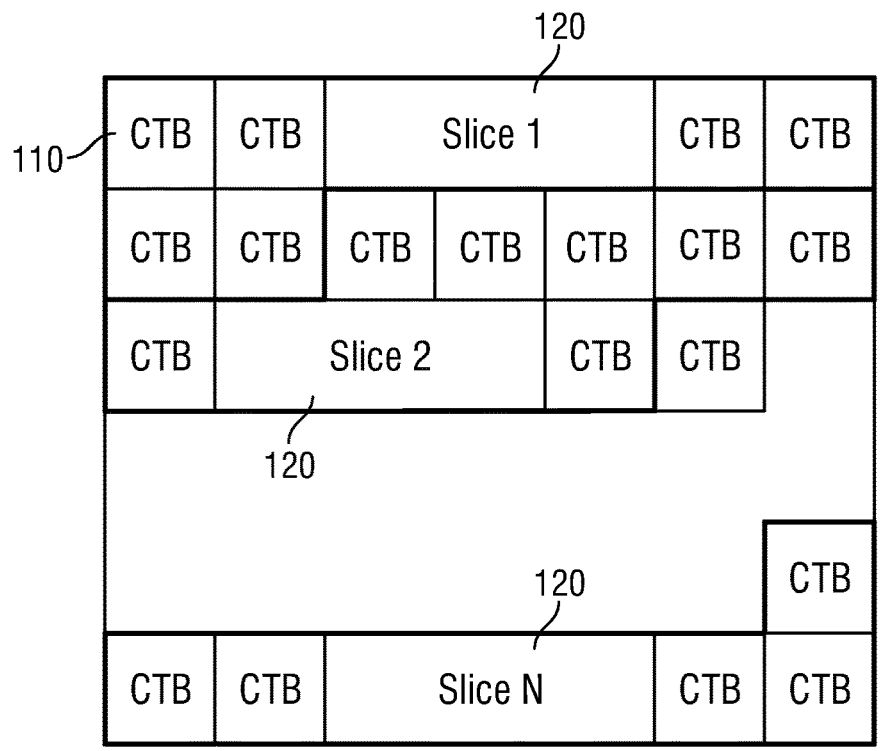
FIG. 2 shows a picture in which a sequence of CTBs are aggregated into a slice.
Figure 3:
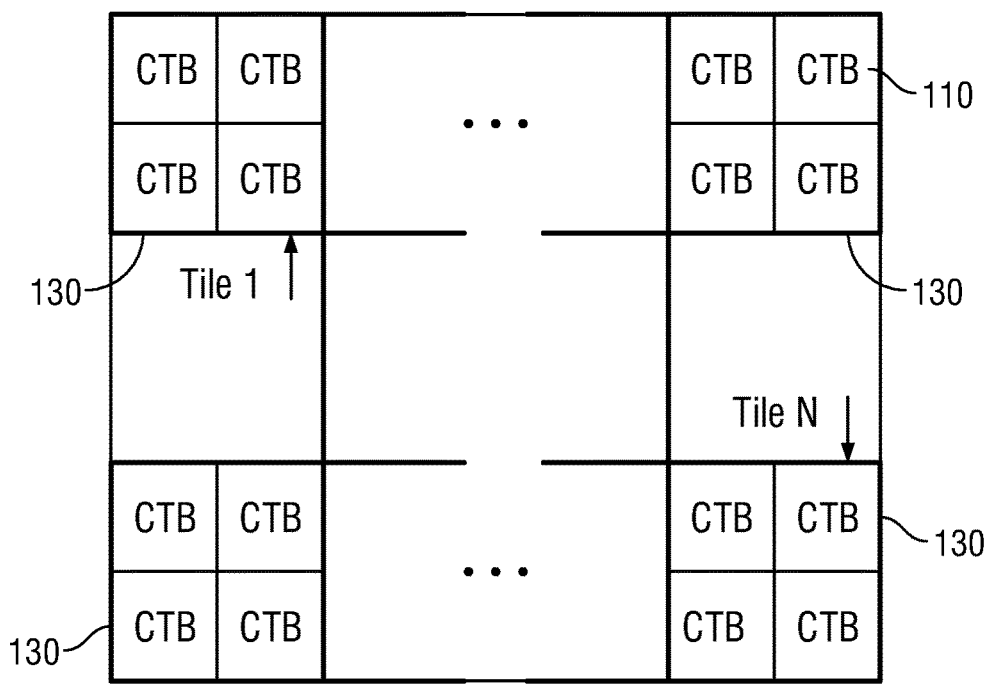
FIG. 3 shows a picture that is divided into a series of tiles.

FIG. 1 shows a picture 100 that is divided into CTBs 110, which are in turn divided into CBs 115 using the aforementioned quadtree structure. As shown in FIG. 2, a sequence of CTBs 110 in a picture 100 may be aggregated into a slice 120. More specifically, slices 120 are sequences of CTBs that are processed in the order of a raster scan. In addition to slices, HEVC also defines tiles, which are self-contained and independently decodable rectangular regions of a picture. FIG. 3 shows a picture that is divided into a series of tiles 130. Each tile 130 is defined a rectangular group of CTBs 110. The tiles may or may not all includes the same number of CTBs. Also defined in HEVC are wavefronts and wavefront parallel processing (WPP), which divides slices into rows of CTBs. Each row can be decoded after certain decisions have been made concerning prediction and adaptation of the entropy coder for the preceding row.

PUs may be considered to be similar to so-called partitions of a block according to other video coding standards, such as, e.g., H.264. Specifically, PUs of a CTB (or CB) are the basis on which prediction for the CTB is performed to produce "residual" coefficients. Residual coefficients of a CTB represent a difference between video data of the CTB and predicted data for the CTB determined using one or more PUs of the CTB. In particular, the one or more PUs specify how the CTB is partitioned for the purpose of prediction, and which prediction technique, or "mode," is used to predict the video data contained within each partition of the CTB.

One or more TUs of a CTB (or CB), on the other hand, specify partitions of a block of the residual coefficients of the CTB on the basis of which a transform is applied to the block to produce a block of transformed residual coefficients for the CTB. The one or more TUs may also be associated with a type of transform that is applied. The transform converts the residual coefficients from a pixel, or spatial, domain to a transform domain, such as, e.g., a frequency domain. In addition, the one or more TUs may specify parameters on the basis of which quantization is applied to the resulting block of transformed residual coefficients to produce a block of quantized transformed residual coefficients. For example, the transformed residual coefficients may be quantized to possibly reduce the amount of data used to represent the coefficients.

To encode a CTB, a video encoder derives one or more predictors for the CTB based on one or more PUs of the CTB. A predictor is a reference block that contains predicted data for the CTB, and is derived on the basis of a corresponding PU for the CTB, as described above. For example, the PU may indicate a partition of the CTB for which predicted data is to be determined, and a prediction mode used to determine the predicted data. The predictor can be derived either through intra (I) prediction (i.e., spatial prediction) or inter (P or B) prediction (i.e., temporal prediction) modes. Hence, some CTBs may be intra-coded (I) using spatial prediction with respect to neighboring reference blocks, or CTBs, in the same frame, while other CTBs may be inter-coded (P or B) with respect to reference blocks, or CTBs, in other frames.

Upon identification of the one or more predictors based on the one or more PUs of the CTB, a video encoder calculates a difference between the original video data of the CTB corresponding to the one or more PUs and the predicted data for the CTB contained in the one or more predictors. This difference, also referred to as a prediction residual, is represented using residual coefficients that correspond to pixel differences between portions of the CTB specified by the one or more PUs and the one or more predictors, as previously described. The residual coefficients are generally arranged in a two-dimensional (2-D) array that corresponds to the one or more PUs of the CTB.

To achieve further compression, the video encoder subsequently transforms the prediction residual, e.g., using a discrete cosine transform (DCT), integer transform, Karhunen-Loeve (K-L) transform, wavelet transform or another transform. Generally speaking, the transform converts the prediction residual, i.e., the residual coefficients, in the spatial domain to transformed residual coefficients in the transform domain, e.g., a frequency domain, as previously described. The transformed residual coefficients are also generally arranged in a two-dimensional (2D) array or block, e.g., transformed coefficient block that corresponds to the one or more TUs of the CTB. For still further compression, the transformed residual coefficients may be quantized to possibly reduce the amount of data used to represent the coefficients, as also described above.

To achieve still further compression, an entropy encoder may subsequently encode the resulting transformed residual coefficients using Context Adaptive Variable Length Coding (CAVLC), Context Adaptive Binary Arithmetic Coding (CABAC), or another entropy coding methodology. Entropy encoding may achieve this further compression by reducing or removing statistical redundancy inherent in the video data of the CTB, as represented by the coefficients, relative to other CTBs.

Figure 4:
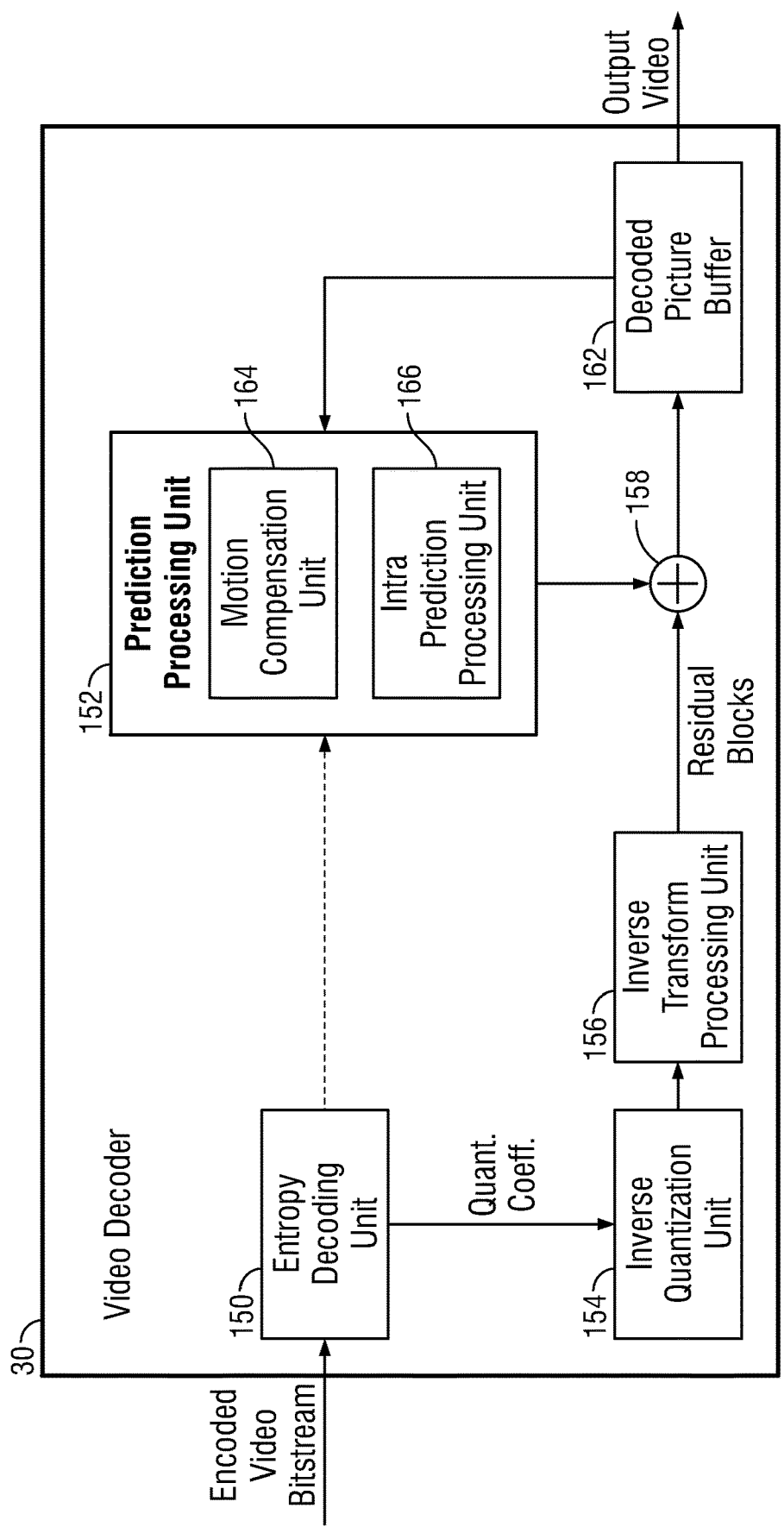
FIG. 4 is a block diagram illustrating an example video decoder that is configured to implement the techniques of this disclosure.

FIG. 4 is a block diagram illustrating an example video decoder 30 that is configured to implement the techniques of this disclosure. FIG. 4 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

In the example of FIG. 4, video decoder 30 includes an entropy decoding unit 150, a prediction processing unit 152, an inverse quantization unit 154, an inverse transform processing unit 156, a reconstruction unit 158, and a decoded picture buffer 162. Prediction processing unit 152 includes a motion compensation unit 164 and an intra-prediction processing unit 166. In other examples, video decoder 30 may include more, fewer, or different functional components.

Video decoder 30 may receive a bitstream. Entropy decoding unit 150 may parse the bitstream to decode syntax elements from the bitstream. Entropy decoding unit 150 may entropy decode entropy-encoded syntax elements in the bitstream. Prediction processing unit 152, inverse quantization unit 154, inverse transform processing unit 156, reconstruction unit 158, and filter unit 160 may generate decoded video data based on the syntax elements extracted from the bitstream.

The bitstream may comprise a series of NAL units. The NAL units of the bitstream may include coded slice NAL units. As part of decoding the bitstream, entropy decoding unit 150 may extract and entropy decode syntax elements from the coded slice NAL units. Each of the coded slices may include a slice header and slice data. The slice header may contain syntax elements pertaining to a slice. The syntax elements in the slice header may include a syntax element that identifies a PPS associated with a picture that contains the slice.

In addition to decoding syntax elements from the bitstream, video decoder 30 may perform a reconstruction operation on a non-partitioned CB. To perform the reconstruction operation on a non-partitioned CB, video decoder 30 may perform a reconstruction operation on each TU of the CB. By performing the reconstruction operation for each TU of the CB, video decoder 30 may reconstruct residual blocks of the CB.

As part of performing a reconstruction operation on a TU of a CB, inverse quantization unit 154 may inverse quantize, i.e., de-quantize, coefficient blocks associated with the TU. Inverse quantization unit 154 may use a QP value associated with the CB of the TU to determine a degree of quantization and, likewise, a degree of inverse quantization for inverse quantization unit 154 to apply. That is, the compression ratio, i.e., the ratio of the number of bits used to represent original sequence and the compressed one, may be controlled by adjusting the value of the QP used when quantizing transform coefficients. The compression ratio may also depend on the method of entropy coding employed.

After inverse quantization unit 154 inverse quantizes a coefficient block, inverse transform processing unit 156 may apply one or more inverse transforms to the coefficient block in order to generate a residual block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

If a PU is encoded using intra prediction, intra-prediction processing unit 166 may perform intra prediction to generate predictive blocks for the PU. Intra-prediction processing unit 166 may use an intra prediction mode to generate the predictive luma, Cb and Cr blocks for the PU based on the prediction blocks of spatially-neighboring PUs. Intra-prediction processing unit 166 may determine the intra prediction mode for the PU based on one or more syntax elements decoded from the bitstream.

Prediction processing unit 152 may construct a first reference picture list and a second reference picture list based on syntax elements extracted from the bitstream. Furthermore, if a PU is encoded using inter prediction, entropy decoding unit 150 may extract motion information for the PU. Motion compensation unit 164 may determine, based on the motion information of the PU, one or more reference regions for the PU. Motion compensation unit 164 may generate, based on samples blocks at the one or more reference blocks for the PU, predictive luma, Cb and Cr blocks for the PU. Reconstruction unit 158 may use the luma, Cb and Cr transform blocks associated with TUs of a CB and the predictive luma, Cb and Cr blocks of the PUs of the CB, i.e., either intra-prediction data or inter-prediction data, as applicable, to reconstruct the luma, Cb and Cr coding blocks of the CB. For example, reconstruction unit 158 may add samples of the luma, Cb and Cr transform blocks to corresponding samples of the predictive luma, Cb and Cr blocks to reconstruct the luma, Cb and Cr coding blocks of the CB.

A filter unit (not shown) may perform in-loop filtering operations to reduce blocking artifacts associated with the luma, Cb and Cr coding blocks of the CB. Video decoder 30 may store the luma, Cb and Cr coding blocks of the CB in decoded picture buffer 162. Decoded picture buffer 162 may provide reference pictures for subsequent motion compensation, intra prediction, and presentation on a display device. For instance, video decoder 30 may perform, based on the luma, Cb and Cr blocks in decoded picture buffer 162, intra prediction or inter prediction operations on PUs of other CBs. In this way, video decoder 30 may extract, from the bitstream, transform coefficient levels of the significant luma coefficient block, inverse quantize the transform coefficient levels, apply an inverse transform to the transform coefficient levels to generate a residue (or residual) block, generate, based at least in part on the residue block, a coding block, and output the coding block for display.

Parallelization of Decoder at Atomic Level

Figure 5:
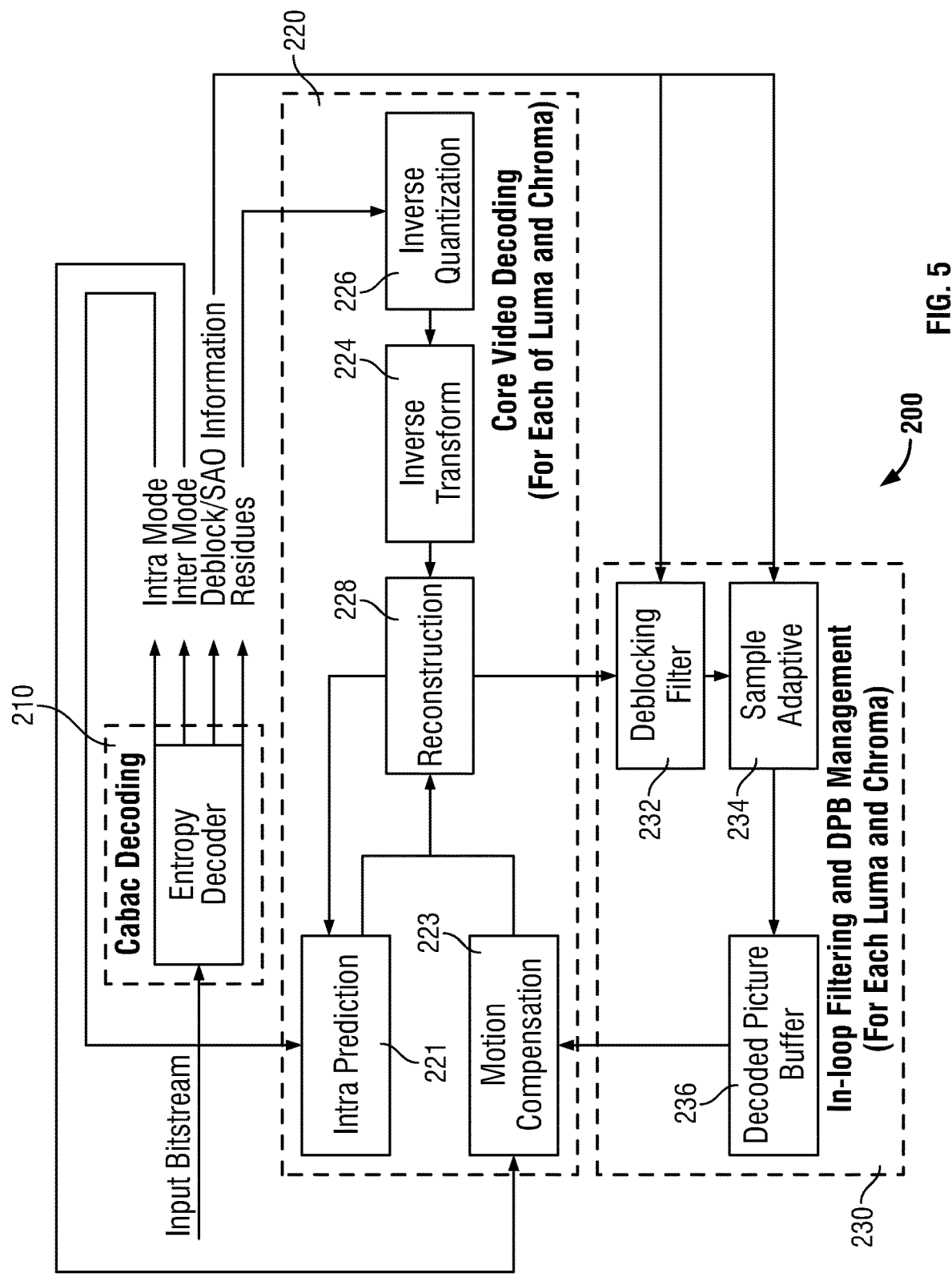
FIG. 5 shows an alternative view of a generic HEVC decoder such as shown in FIG. 4 that is useful for facilitating an understanding of the subject matter disclosed herein.

FIG. 5 shows an alternative view of a generic HEVC decoder such as shown in FIG. 4 that is useful for facilitating an understanding of the subject matter disclosed herein. In this example the functionality of the decoder 200 is divided into three categories: CABAC decoding 210, core video decoding 220 and in-loop filtering and decoded picture buffer (DPB) management 230. The CABAC entropy decoder 210 forms the first stage of HEVC decoder, where all the syntax elements are decoded. The Core Video Decoding 220 includes intra prediction 221, motion-compensation 223, inverse transform 224, inverse quantization 226 and inverse reconstruction 228. This core video decoding process is carried out for each of the luma and chroma components. Hence these components are separately considered from the perspective of scheduling decoder on multi-core architecture. The in-loop filtering and DPB management 230 includes deblocking 232 and SAO 234. The filtered frame is then placed in the decoded picture buffer 236. The reference frame management of the DPB is performed after the processing of each frame.

The techniques described herein employ a so-called atomic parallelization scheme that can be used either in addition to or in place of standard parallelization tools such as tiles and wavefronts (WPP) to maximize the usage of all cores in a multi-core system. This scheme includes the identification of independent modules that can be parallelized and the scheduling of those modules in an optimal manner based on the characteristics of the encoded stream.

In a typical HEVC decoder CABAC and core video decoding are typically performed one CB at a time. In the present case, data associated with all constituent CBs of a given CTB is generally aggregated to improve efficiency of dispatch. CABAC decoding is sequential in nature and the decoding of each CB/CTB depends on the previously decoded CB/CTB. The core video decoding only requires the completion of entropy decoding of all required syntax elements for the given CB/CTB. Also the decoding for luma and chroma are completely independent and hence can be done in parallel. Hence, in a staggered manner the CABAC decoding of one CB/CTB can be parallelized with the core video decoding of the previous CB/CTB.

Processing one CTB at a time has a dual advantage over processing one CB at a time. Firstly the dispatch overheads are reduced. Secondly, CTB sizes are fixed as opposed to CB sizes. Hence the processing times for two consecutive CBs would tend to vary much more widely than for consecutive CTBs. Thus, processing one CTB at a time provides for better load balancing.

In accordance with one aspect of the disclosure, three independent modules may be identified that operate at the CTB level and which are collectively referred to herein as atomic decoding functions.

Core Video Decoding of Luma CTB
Core Video Decoding of the Chroma CTB
CABAC decoding of (the next) CTB.

Appropriate scheduling mechanisms may be used to decode a video stream on a dual core processor using the above mentioned modules. Experiments have demonstrated that these mechanisms yield on the order of a 40% savings in decoding complexity over decoding on a single core processor.

Consider a static scheduling of CABAC on one core and Luma and Chroma decoding on the other. If the processing time for decoding the Luma and chroma CTBs, is greater than the processing time for decoding of the CABAC CTB, the video decoding thread would incur a wait state. Similarly, consider a static scheduling of CABAC and Chroma decoding on one core and the Luma decoding on the other core. If the CABAC decoding processing time is very great, the luma processing thread will incur a wait state. It has been found experimentally that both of the above conditions may occur quite frequently in the same video sequence.

Improved performance may be achieved by fine tuning the load balancing. Accordingly, in some implementations the scheduling of two of the modules on one core and the scheduling of other module on the other core may be performed in a dynamic manner based on the number of bits in a CTB. More specifically, for CTBs with fewer bits, CABAC and Core video decoding of the Chroma CTBs may be performed in one core while dispatching the decoding of the luma CTB to the other core, thereby providing better load balancing. On the other hand, for CTBs with a large number of bits, CABAC is very expensive in terms of processing and hence performing CABAC in one core while decoding both luma and chroma CTBs in the other core may provide better load balancing.

Figure 6:
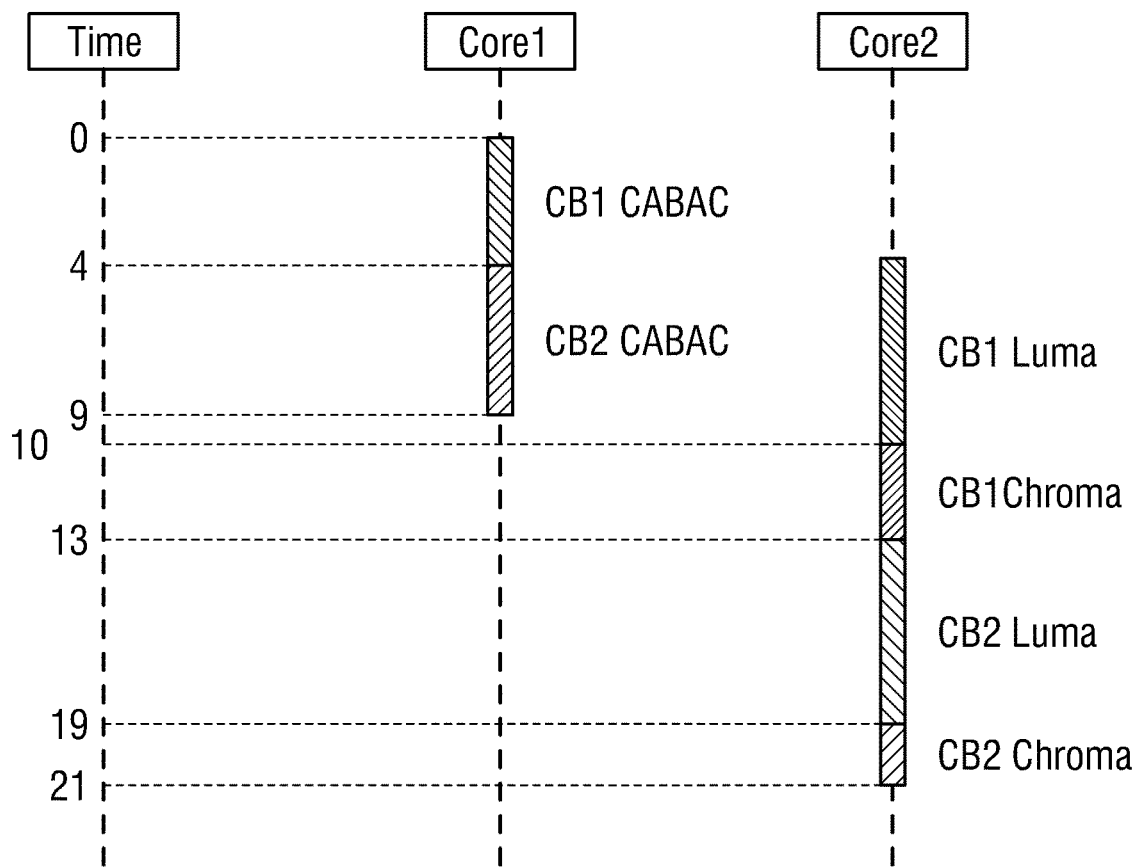
FIG. 6 is a sequence/timing diagram showing an example in which CABAC is performed on one core and Luma+Chroma video processing is performed on another core.
Figure 7:
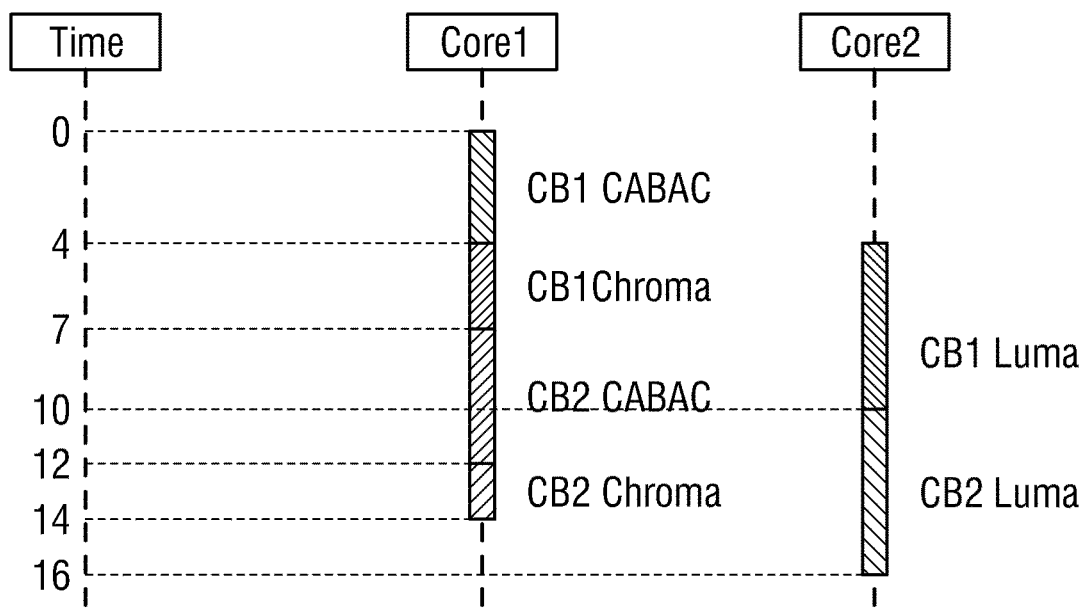
FIG. 7 is a sequence/timing diagram showing an example in which CABAC and Chroma processing is performed on one processor and Luma is performed on the other processor.

FIG. 6 is a sequence/timing diagram showing an example in which CABAC is performed on one core and Luma+Chroma video processing is performed on another core. In this example, the CABAC core is not heavily loaded since the number of bits contained in each block is relatively not very high. Hence, the core on which CABAC processing is performed incurs wait periods (time periods 9-21 in FIG. 6) after finishing the CABAC processing. This problem can be solved if the processing is scheduling as shown in FIG. 7, in which CABAC and Chroma processing is performed on one processor and Luma is performed on the other processor.

Table 1 depicts four methods of scheduling the CABAC and core video decoding functions across core-1 and core-2.

TABLE 1

Different scheduling methods

| Method | CORE-1 | CORE-2 |
| --- | --- | --- |
| 1 | CABAC, Luma & Chroma (single core) | |
| 2 | CABAC & Chroma core processing | Luma core processing |
| 3 | CABAC | Chroma & Luma core processing |
| 4 | CABAC & Luma core processing | Chroma core processing |

Methods 2 and 3 were experimentally found to yield good results depending on the number of bits per CTB. Method 2 has been found to perform better when fewer bits are present per CTB while method 3 was found to perform better when a greater number of bits are present per CTB.

Figure 8:
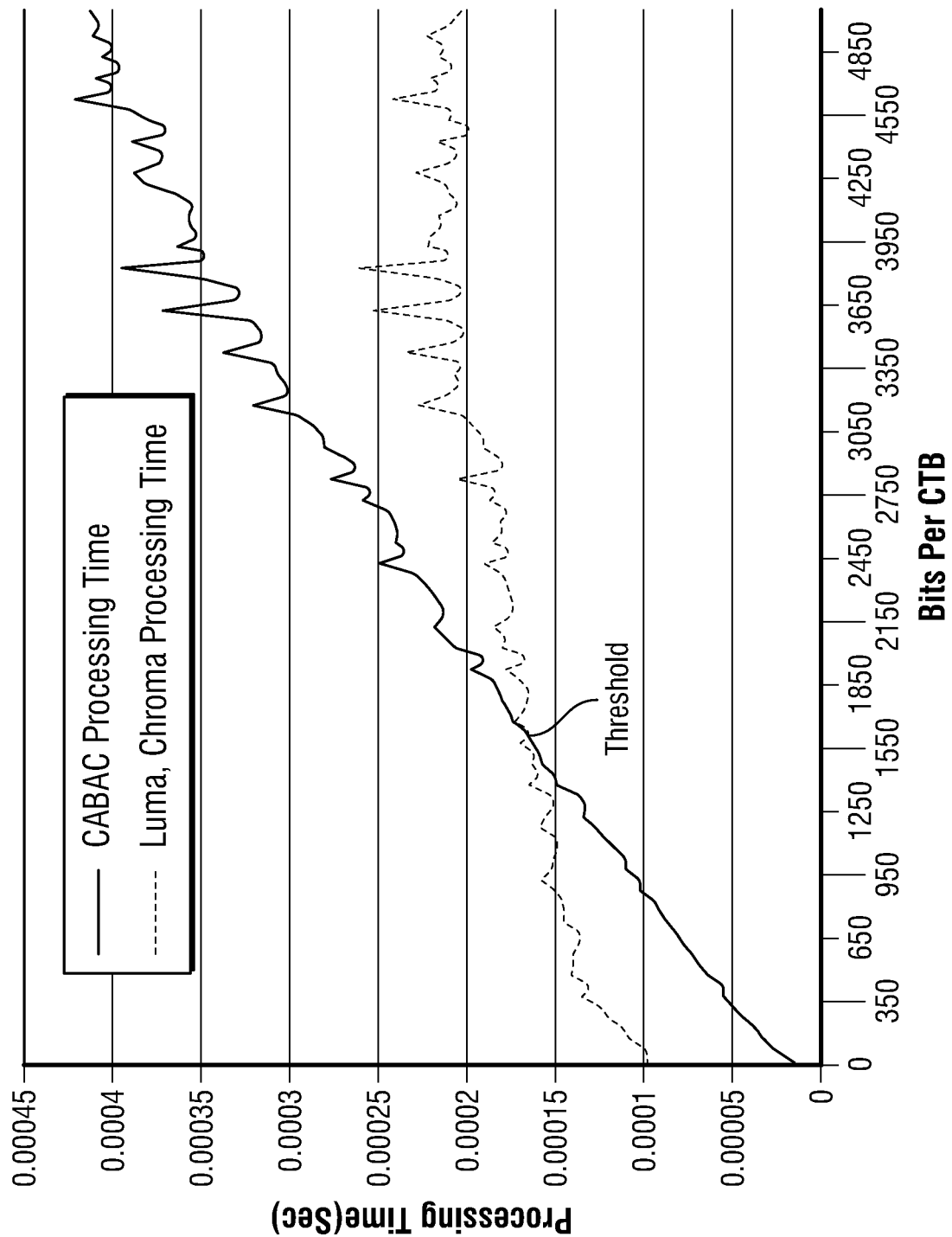
FIG. 8 is a graph showing the processing time for CABAC and Core Video Decoding for CTBs of different sizes.

FIG. 8 is a graph showing the processing time for CABAC and Core Video Decoding for CTBs of different sizes (in terms of the number of encoded bits contained in each CTB). As the graph shows, CABAC processing takes less time than core video processing for lower bit-rates and the inverse is true at higher bit-rates. The threshold, or the bits-per-CTB above which CABAC takes longer was derived by measuring the timing of CABAC and Core video processing for the different CTB sizes. This value of the threshold may be used to dynamically schedule either method-2 or method-3 of Table 1.

Figure 9:
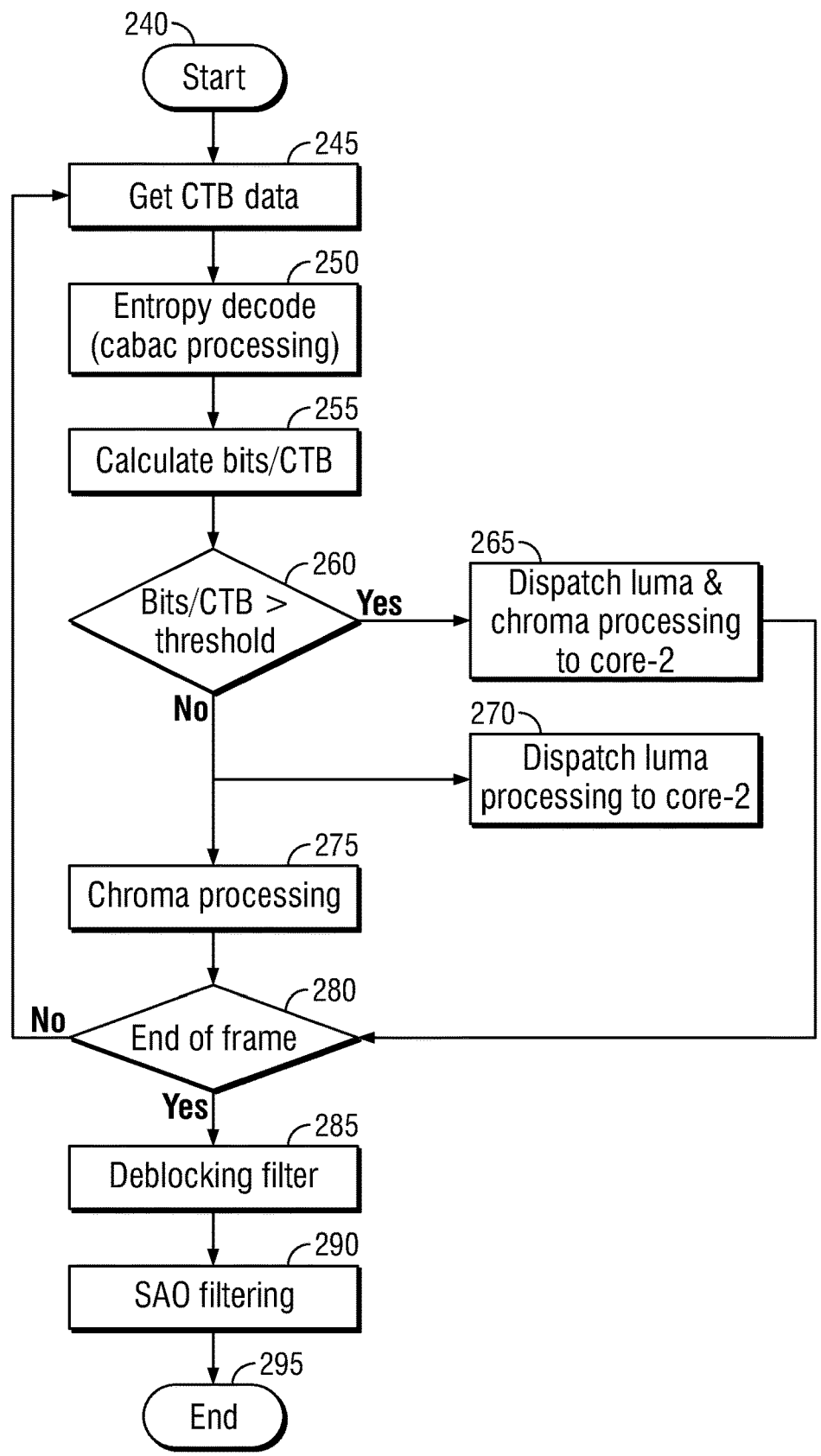
FIG. 9 is a flowchart showing how one frame or picture of data is decoded using the proposed algorithm.

The flowchart in FIG. 9 shows how one frame or picture of data is decoded using the proposed algorithm. The method begins at step 240 and continues at step 245 where CTB data for the frame is obtained and decoded at step 250 using an entropy decoding technique such as CABAC. Entropy decoding may be performed on one of the cores (e.g., core 1) of a multicore processor. Next, at step 255 the number bits contained in the CTB for that frame is calculated. If at decision step 260 the number of bits exceeds a threshold, then the process continues to step 265, where both luma and chroma core processing are dispatched to the same core (e.g., core 2). On the other hand, if at decision step 260 the number of bits does not exceed the threshold, then the process continues to steps 270 and 275, where luma core processing is dispatched to another core (core 2) and chroma core processing is performed on a different core (e.g., core 1). After luma and chroma core processing are performed, the method determines if the frame is completed at decision step 280. If not, the process returns to step 245 and continues for another CTB. Once the frame is determined to be completed at decision step 280, the method proceeds to step 285 and 290 where deblocking filtering and SAO filtering are respectively performed. The method then ends at step 295.

Experiments with different types of streams covering a range of bit rates, resolutions and different QPs were conducted. As previously mentioned, an improvement in decoding time on the order of 40% was seen over an optimized single-core implementation. It was found that atomic load balancing using the thresholding mechanism and a choice of dispatch method on a per CTB basis gave up to 10% improvement in decoding time over scheduling the modules in a static manner.

It should be noted that the experimental and simulation results described herein were developed on an iPad4, which is a dual core device, with each core being an ARM A15 processor. GCD (Grand Central Dispatch) was used to dispatch tasks. GCD provide APIs to dispatch blocks (i.e., block of code/function to be processed in parallel) to multiple queues. These APIs internally handle thread creation, message processing and scheduling specific tasks in a queue across cores. Dispatch overheads incurred vary across programming environments. Hence the improvements shown using the techniques described herein may vary across different platforms and development environments.

It should also be noted that the memory design also plays a crucial role in the performance of the decoder. While it is true that the CABAC decoding of the next CTB does not require data from the core video decoding of the previous CTB, it is important that the memory design does not assume a re-use of the previous CTB memory. Only then can the CABAC decoding of the next CTB be done in parallel with the core video decoding of the previous CTBs.

It is well known that the luma and chroma video processing can largely be done in parallel. Hence, luma and chroma memory needs to be independent. Moreover, the memory design should ensure that the memory for the luma and chroma blocks are not placed adjacent to each other. This is to ensure that false sharing does not happen. If luma and chroma memory blocks are placed adjacent to each other, there is a high probability that data from both may be loaded into the same cache line. In such a case even though both luma and chroma modules do not access the same data, the cache lines may get refreshed as they both access data from the same cache line. In addition to atomic parallelization techniques, other decoding techniques may be applied to macroscopic constructs such as tiles, wavefronts and slices, for example. Each macroscopic construct can be essentially independently decoded (in some specific cases, involving some cross-boundary filtering that will not impact the following discussion). Any macroscopic construct is made up of constituent blocks (e.g., Coding Tree Blocks or CTBs in HEVC). Parallelization of decoding of macroscopic constructs from a scheduling perspective views each macroscopic construct 'monolithically' in that there is no need for tight (and explicit) synchronization of the constituent atomic functions of each block of each of the macroscopic constructs.

As an example, consider that tile X is being decoded in parallel with tile Y. Assume tile X comprises blocks $X_1$, $X_2, \ldots X_n$ and tile Y comprises of blocks $Y_1, Y_2, \ldots Y_m$. From a video decoding perspective, decoding each of the blocks $X_1, X_2, \ldots X_n$ and $Y_1, Y_2, \ldots Y_m$ involves constituent basic decoding functions (CABAC, video decoding of luma, video decoding of chroma), which are also referred to herein as 'atomic functions'.

From a parallelization strategy perspective, when tiles X and Y are considered in a macroscopic decoding scheme, there is no need for any atomic function of $X_1$ (say CABAC) to be tightly/explicitly synchronized with any atomic function of $Y_1$ (say core video decoding of luma/chroma or CABAC).

Examples a parallelization of various macroscopic constructs will be presented below.

Parallelization in the Presence of Tiles

As previously mentioned, HEVC allows the partitioning of a picture into rectangular regions called tiles (see FIG. 3). Tiles can be independently decoded after parsing some shared header information. Use of tiles allows parallelism at a picture/subpicture level of granularity. A single tile may contain multiple slices. Alternatively, a single slice may contain multiple tiles.

Tiles were introduced into the HEVC Standard to support parallelism. The tile structure allows the partitioning of video frame into square and rectangular shapes. Both the size and shape of tiles can be freely defined by controlling the number of row and column partitions.

In accordance with one aspect of the present disclosure, a method is provided to optimally utilize the multi-core capabilities of a processor for decoding streams which contain tiles. This method has been found to outperform existing decoding techniques, particularly when the tile sizes are unequal in terms of the contained number of bytes.

Tiles are considered independent since coding and prediction dependencies such as motion vector prediction, intra prediction, entropy coding and context selection, are broken through its boundaries. In HEVC, for the encoder and decoder to know where each tile is located in the frame/bitstream (for reconstruction of the complete picture), the HEVC Standard provides a mechanism for inserting markers into the bitstream to indicate the tiles entry points. Alternatively, the tile offsets can be signaled in the slice header. The number of bytes required to encode each tile can be derived using the byte offsets of tile available in the slice header.

In general tile parallelization may be more efficient than the aforementioned atomic parallelization technique since dispatch size to the CPU cores is relatively large when tile parallelization is employed in comparison to atomic parallelization.

Figure 10:
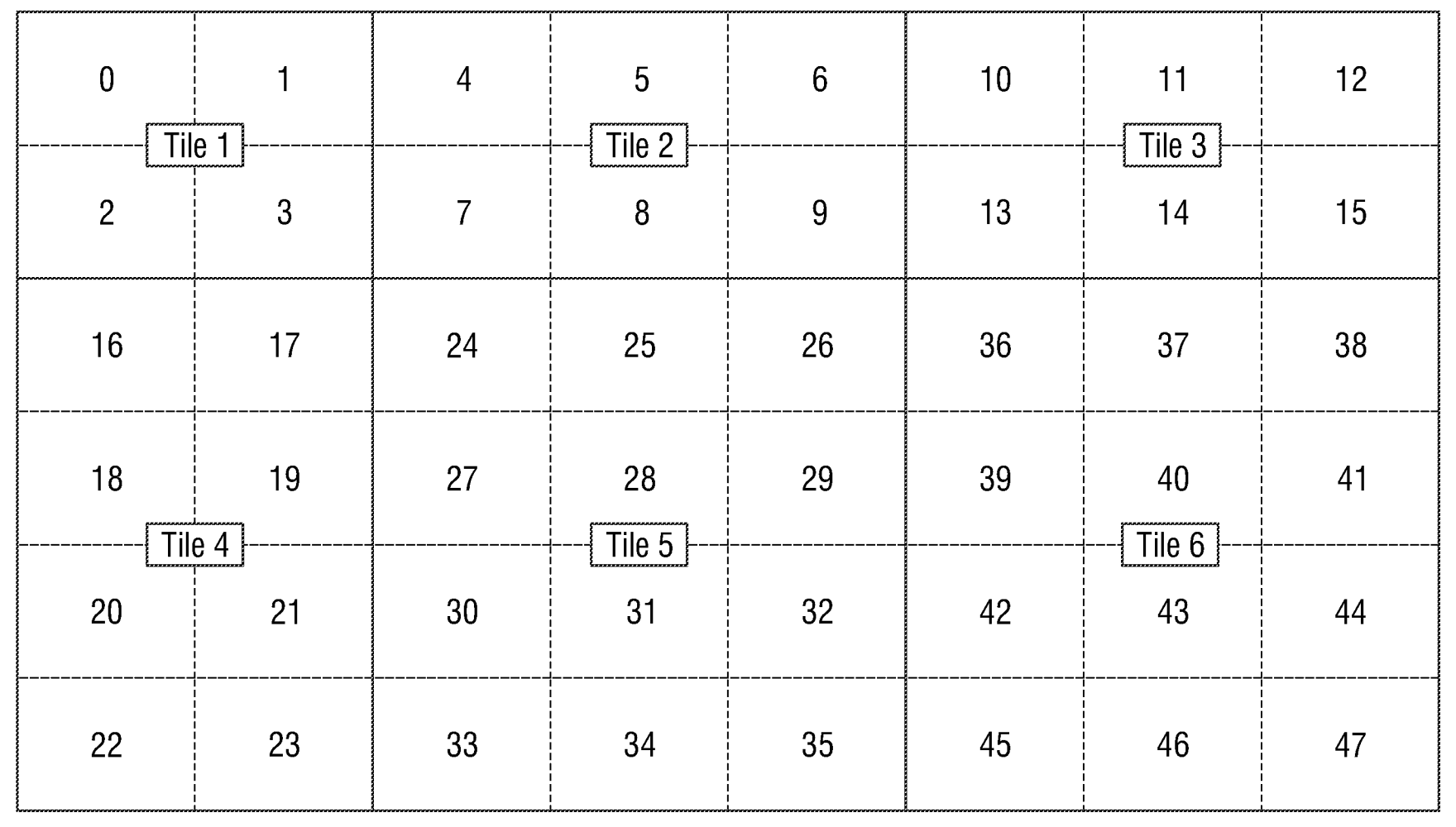

FIG. 10 shows an illustrative frame or picture that is divided into 6 tiles of different sizes. Of course, the frame may be divided into any suitable number of frames. Suppose the number of bytes required to encode tiles 1, 2, 3, 4, 5, 6 are 4, 6, 6, 8, 12, 12 kilobytes respectively. Further assume that 4 cores available in the processor platform. Normally the decoding time is directly proportional to the number of bits in each tile.

Figure 11:
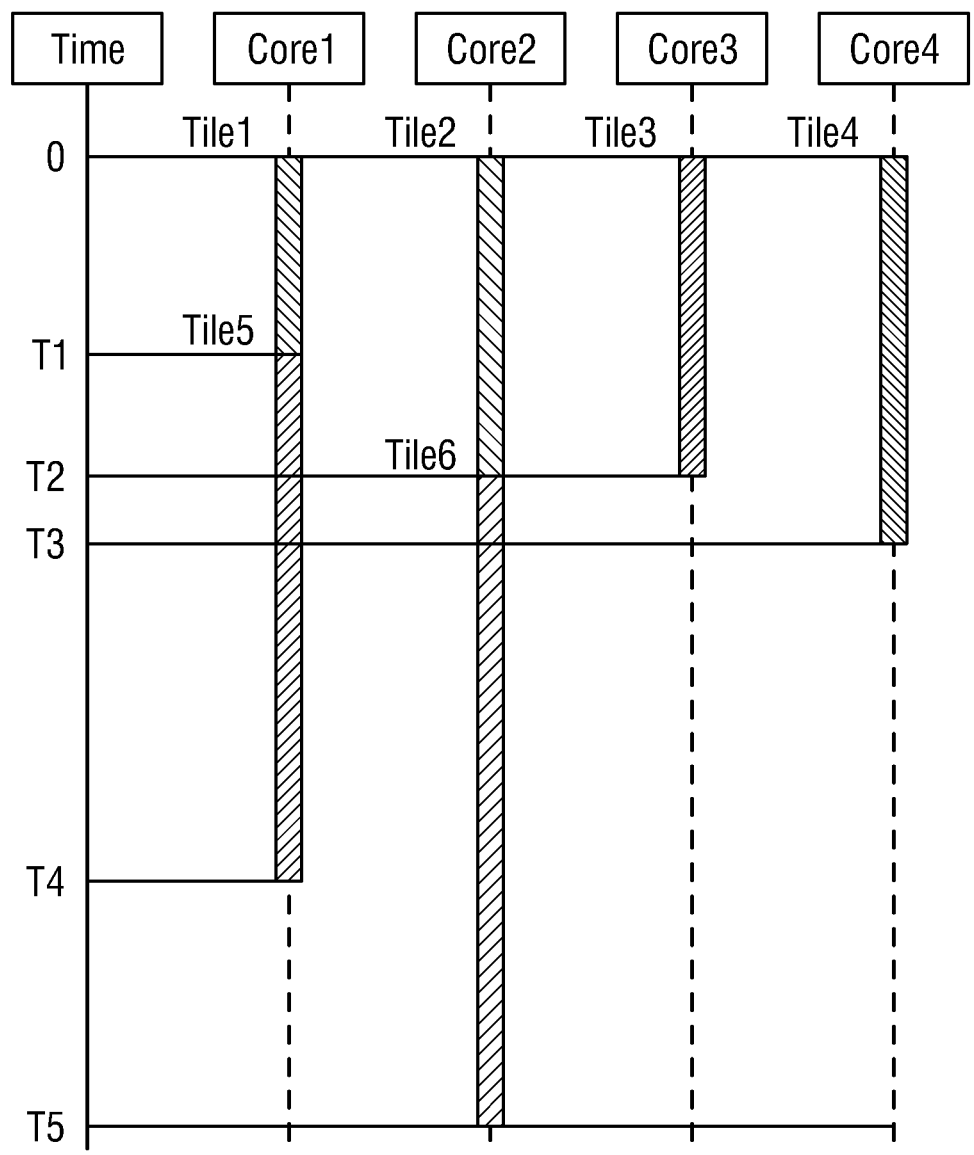
FIG. 11 is a sequence/timing diagram in which tiles are simplistically dispatched in a sequential manner to different CPU cores.

FIG. 11 is a sequence/timing diagram in which tiles are simplistically dispatched in a sequential manner to different CPU cores. That is, the tiles are dispatched in the order they occur in the bitstream. In particular, as shown in FIG. 7, tiles 1, 2, 3 and 4 are first dispatched to cores 1, 2, 3 and 4, respectively. Then, when core 1 becomes available tile 5 is dispatched to core 1. Likewise, tile 6 is dispatched to core 3 when that core becomes available. CPU idle times are indicated by the dotted lines. As further shown, the idle time for core 1 is T5-T4, for core 3 the idle time is T5-T2 and for core 4 the idle time is T5-T3. Thus, dispatching the tiles sequentially to different cores does not efficiently utilize all the cores, resulting in an increase in the decoding time of the frame.

Figure 12:
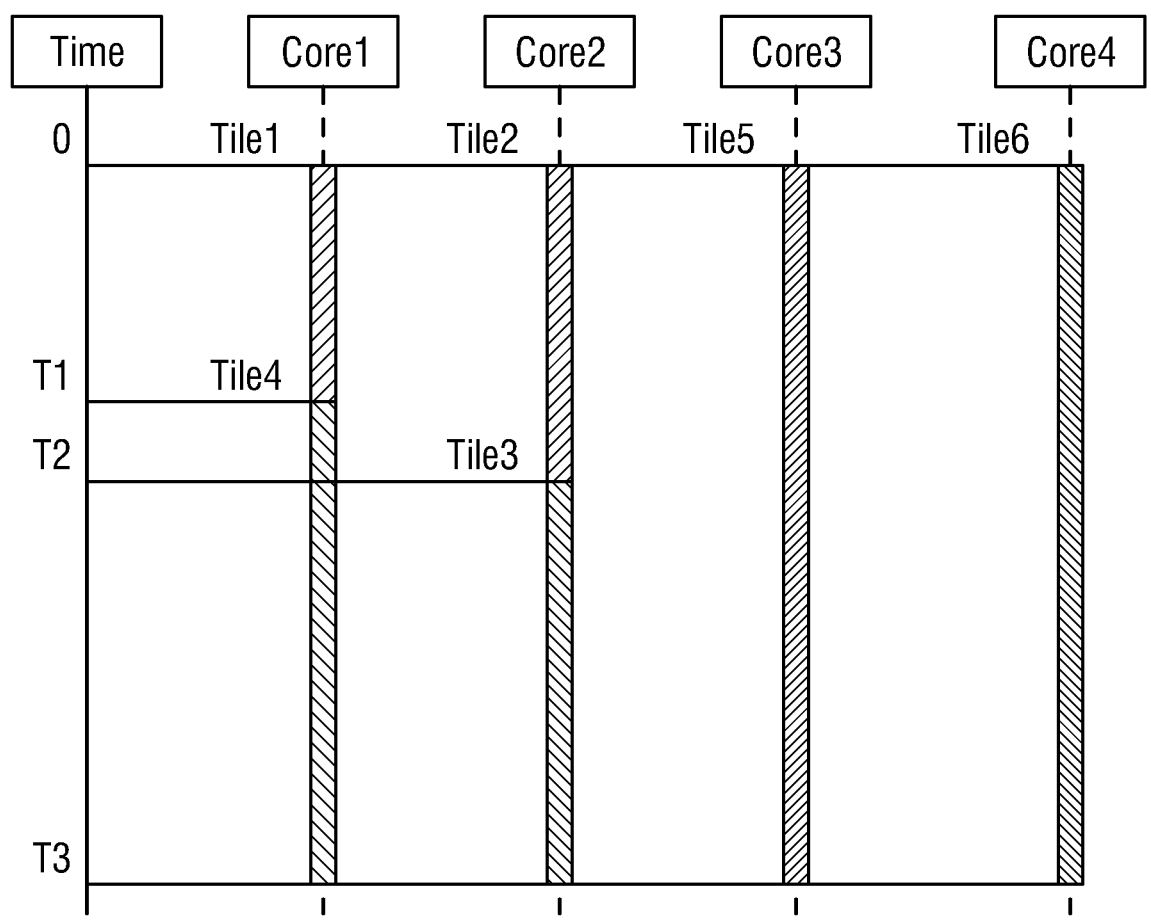
FIG. 12 is a sequence/timing diagram in which tiles are dispatched in an efficient manner to different CPU cores.

In accordance with one aspect of the disclosure, rather than simply dispatching tiles in a sequential manner, tiles are grouped into sets such that the total number of bytes for all the tiles in a set should be more or less equal to the total number of bytes in the other sets. For example, the tiles in the frame shown in FIG. 10 may be grouped into 4 sets. Each group of tiles contains approximately an equal number of constituent compressed bytes. In particular, tiles 1 and 4 are grouped into one set, tiles 2 and 3 are grouped into another set, title 5 is grouped into its own set, and tile 6 is grouped by itself into yet another set. Based on these proposed groupings, 4 sets of tiles are dispatched to the 4 cores as shown in FIG. 12. As FIG. 12 illustrates, all the CPU cores are loaded efficiently with less idle time compared to the simplistic, sequential dispatching of tiles. In this way the time required to decode a frame can be reduced.

Figure 13:
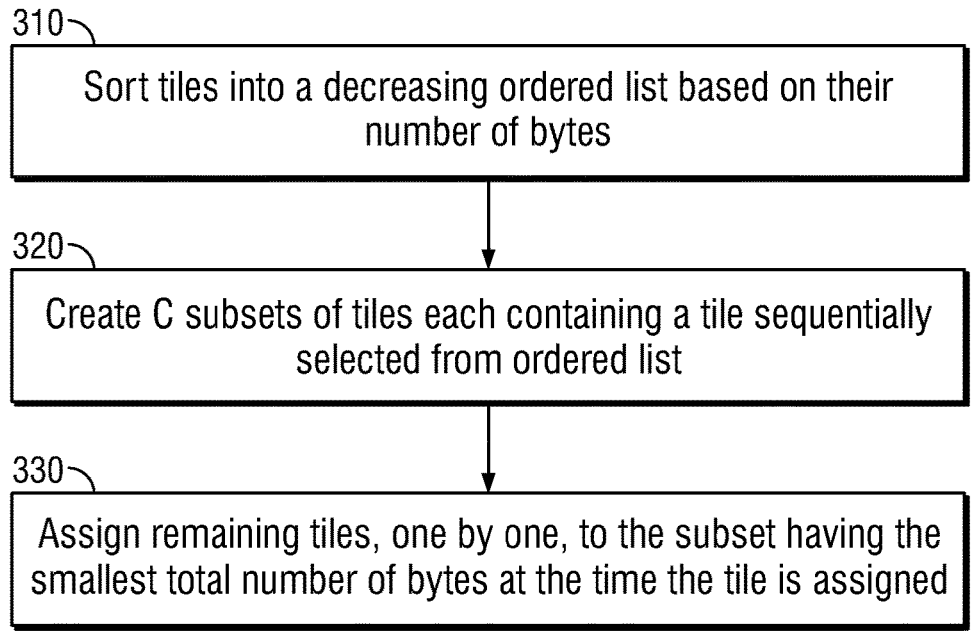
FIG. 13 is a flowchart showing one example of how tiles may undergo load balancing.

The technique of grouping tiles into sets as illustrated above may be generalized as follows. Assume that a processor has C cores. Hence, to accomplish load balancing C subsets of tiles are needed, where the sums of the constituent compressed bytes in the subsets are nearly equal to one another. Referring to the flowchart of FIG. 13, in step 310 the technique first sorts all the individual tiles in decreasing order based on the number of bytes they contain. C subsets of tiles are then created in step 320, with each subset initially containing one element each, selected, in order, from the decreasing ordered list. Subsequently, in step 330 each of the remaining tiles is assigned, one by one, to the subset that has the smallest sum at the time each respective tile is assigned.

As an example, assume a frame has tiles with 6, 4, 10, 8 and 9 kilobytes respectively. First, sort the list in decreasing order to yield {10, 9, 8, 6, 5, 4}. Assuming there are 3 cores available, the tiles are to be split into three subsets. Accordingly, the first 3 elements viz. 10, 9 and 8, are assigned to different subsets. That is, S1={10}, S2={9}, S3={8}. Next, assign tile 6 to subset S3, which currently has the smallest sum. Thus, the subsets are now:

S3={8, 6}, S1={10}, S2={9}

Tile 5 is then assigned to subset S2, which currently has the smallest sum. Thus, the subsets are now:

S2={9, 5}, S3={8, 6}, S1={10}.

Tile 4 is next assigned to subset S1, which currently has the smallest sum. Thus, the subsets are now:

S1={10, 4}, S2={9, 5}. S3={8, 6}, which achieves the desired load balancing.

Since dispatching tiles reduces the dispatch overheads vis-à-vis atomic parallelization (considering the size of the dispatched tasks), the dispatch of tiles, whenever available, was found to yield an improvement over a purely atomic parallelization scheme. Simulations performed on the platform described above found improvements of about 15% for some example streams that were processed.

Figure 14:
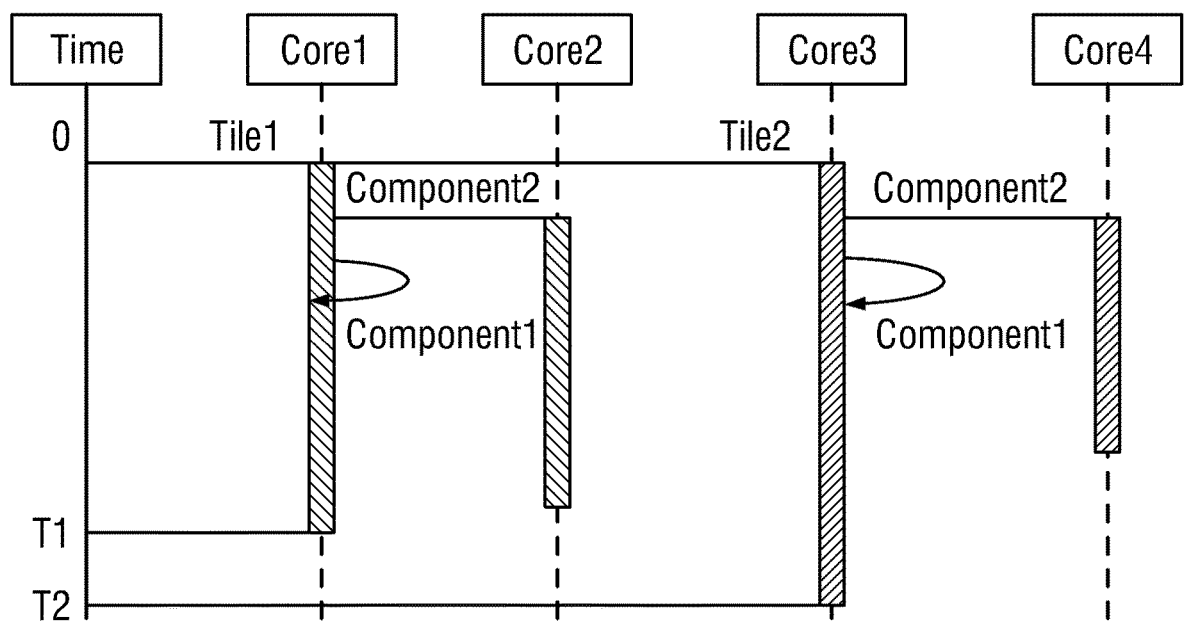
FIG. 14 is a sequence/timing diagram in 2 tiles are dispatched among 4 CPU cores.

The manner of dispatching tiles described herein may also be employed when the number of tiles is less than the number of available cores. For example, suppose there are 2 tiles in a frame and that 4 CPU cores are available. In this case the tiles may be dispatched as shown in FIG. 14. As shown, tiles 1 and 2 are dispatched to core 1 and core 3, respectively. The processing of each tile is then divided into components 1 and 2, where components 1 and 2 are atomic functions of the atomic parallelization technique previously described. Component 2 of tile 1 is then dispatched to core 2 (leaving the processing of component 1 of tile 1 to core 1) and component 2 of tile 2 is dispatched to core 4 (leaving the processing of component 1 of tile 2 to core 3), thereby efficiently utilizing all the cores. As previously discussed, component 1 may involve, for example, CABAC processing and core video Chroma decoding while component 2 may involve core video Luma decoding. Alternatively, as another example, component 1 may involve CABAC processing while component 2 involves core video Chroma and Luma decoding. More generally, the components 1 and 2 that are dispatched across two cores may be selected in accordance with any of the methods shown in Table 1.

Parallelization in the Presence of Wavefronts

Figure 15:
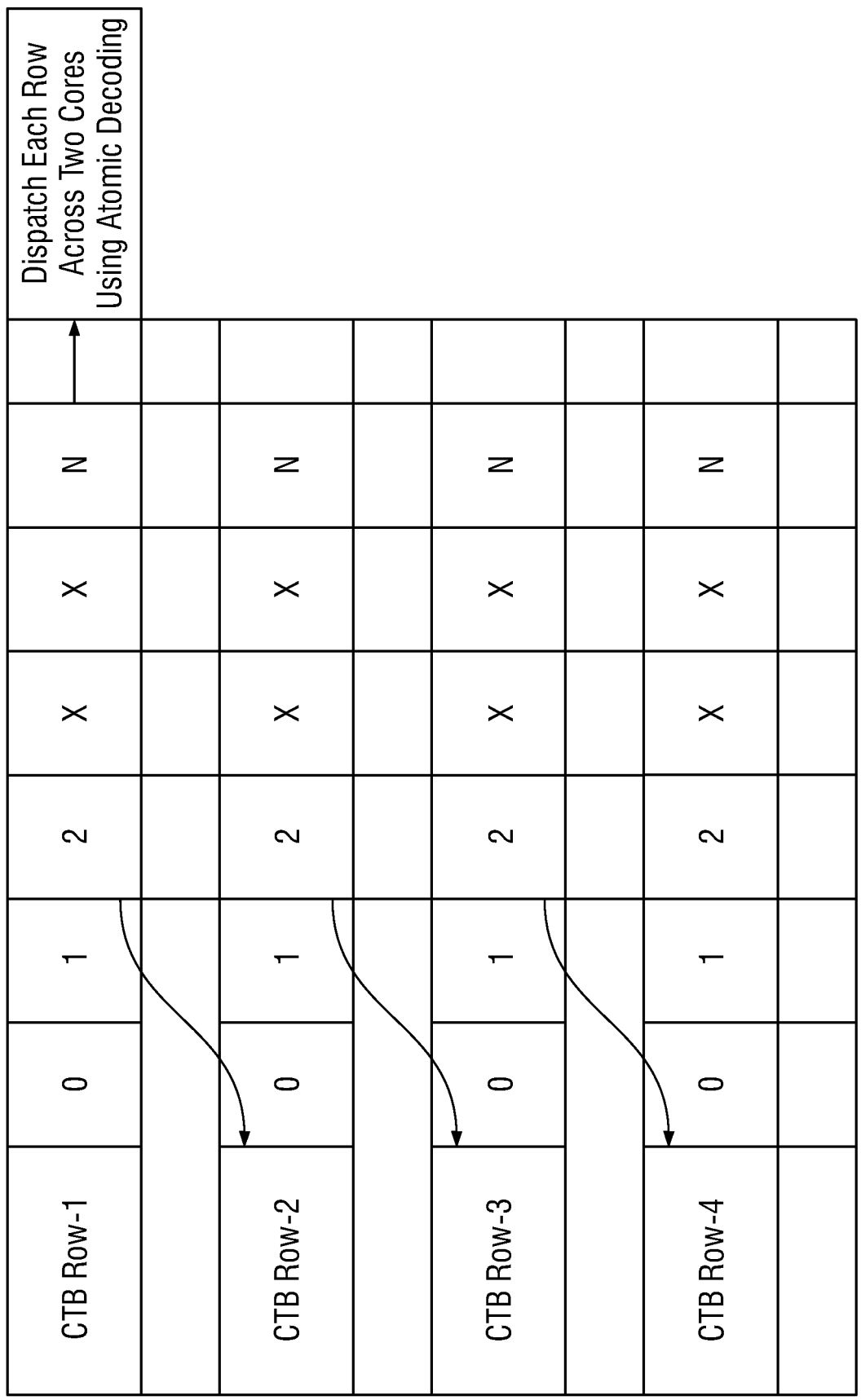
FIG. 15 shows the dependency of decoding each row of CTBs on preceding CTB rows.

As previously mentioned, HEVC also defines wavefronts and wavefront parallel processing (WPP), which divides slices into rows of CTBs. This supports parallel processing of rows of CTBs by using several processing threads in the decoder. However, all CTB rows cannot start execution in parallel because the decoding of one row requires certain information from the preceding row. The Cabac context probability model for the next row is initialized after the first two CTBs of the current row are decoded. Thus there is a dependency to commence each row as shown in the example of FIG. 15, which divides a slice into four rows.

In accordance with one aspect of the techniques described herein, a parallelizing scheme is employed to optimize WPP processing on multi-core platforms. In this method, each row is processed across multiple cores to reduce the wait time to start consecutive row. Using atomic parallelization in this way improves the overall performance and uses all the cores in the system optimally.

Figure 16A:
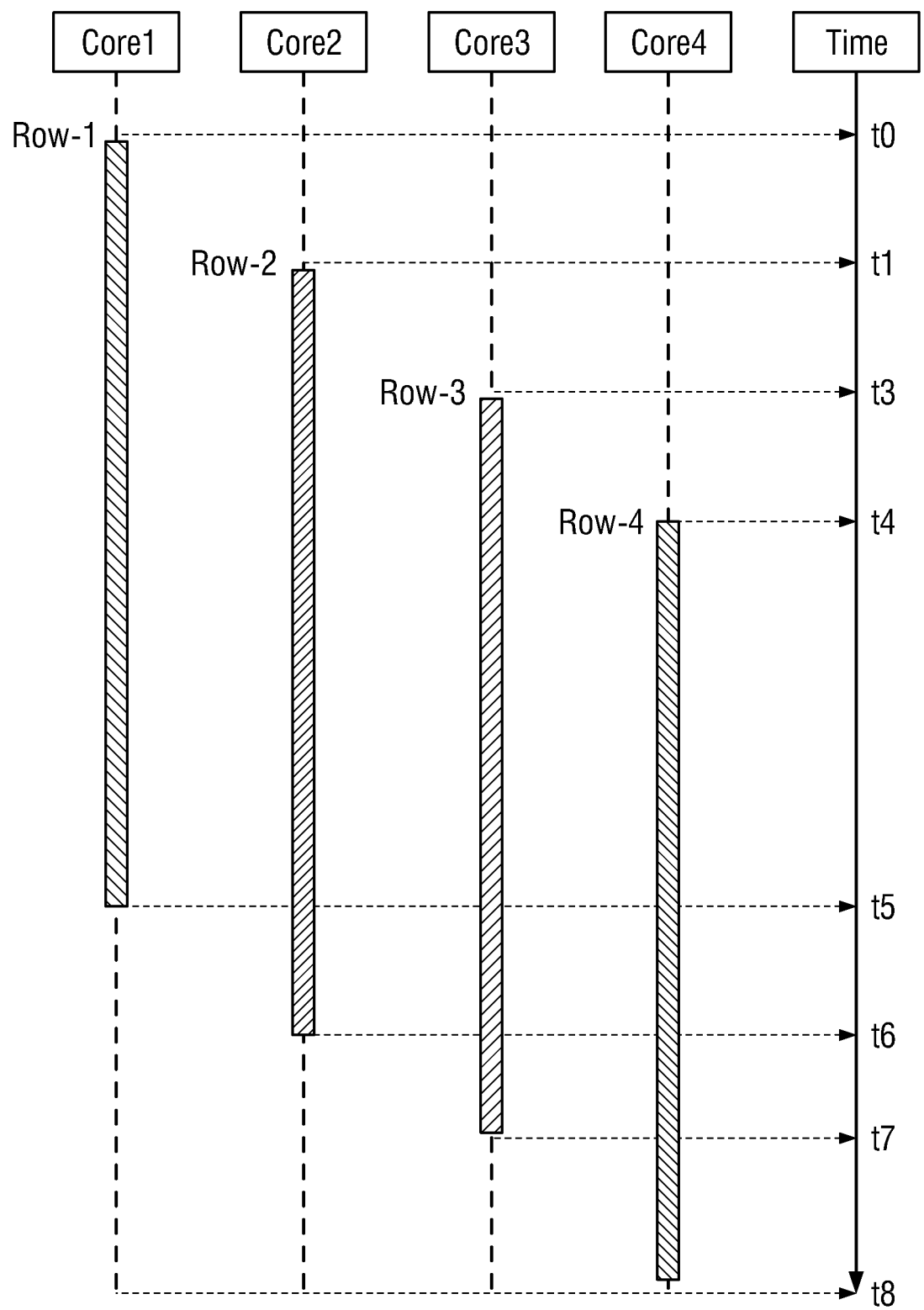
FIGS. 16*a* and 16*b* are sequence/timing diagrams showing parallel processing of wavefronts without and with atomic parallelization respectively.
Figure 16B:
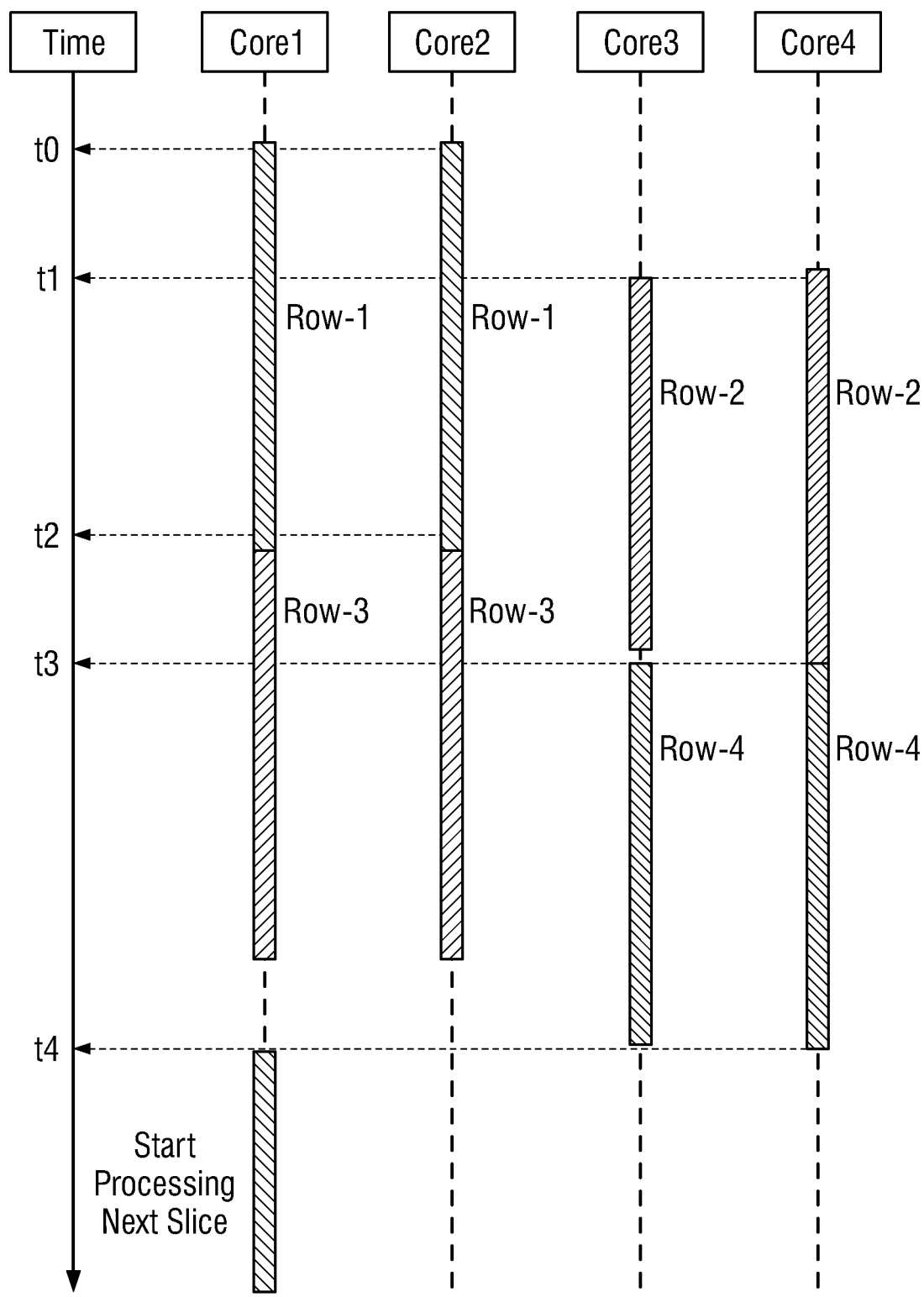

Parallel processing wavefronts without and with atomic parallelization is illustrated in the sequence/timing diagrams of FIGS. 16a and 16b, respectively. This example assumes that there are four cores and a slice containing four rows. FIG. 16a shows parallel processing of wavefronts in the absence of the atomic parallelization scheme. In this case rows 1, 2, 3 and 4 are dispatched to cores 1, 2, 3 and 4, respectively. The processing of each row can only begin after a certain amount of processing has been performed on the preceding row. FIG. 16b depicts the CPU usage as well as improvement in performance when the atomic parallelization scheme is enabled. In this case the processing of each row is dispatched across two cores using one of the methods selected from Table 1. For example, in FIG. 16b the processing of row 1 is dispatched across cores 1 and 2 and the processing of row 2 is dispatched across cores 3 and 4. The processing of row 3 is then dispatched across cores 1 and 2 after the processing of row 1 is completed. Likewise, the processing of row 4 is dispatched across cores 3 and 4 after the processing of core 2 is completed. The sequences diagrams in FIGS. 16a and 16b clearly show that the idle time across the cores is reduced when WPP is performed with atomic parallelization.

Parallelization of De-Blocking and SAO

Two in-loop filters, De-blocking (DB) and Sample adaptive offset (SAO), are applied on reconstructed samples of the decoded frame before displaying it. The de-blocking filter is applied to luma and chroma samples next to TU or PU boundaries. The strength of this filter may be controlled by syntax elements signaled in the HEVC bitstream. The de-blocking filter is intended to reduce visual artifacts around block/unit edges that may be introduced by the lossy encoding process. In-loop filtering is one of the more CPU intensive modules in video decoding.

The SAO filter is an optional filter that enables adjustment of the decoded video frames and can enhance the appearance of smooth regions and edges of objects. The SAO filter is a non-linear filter that makes use of look-up tables that may be signaled in the HEVC bitstream.

Figure 17:
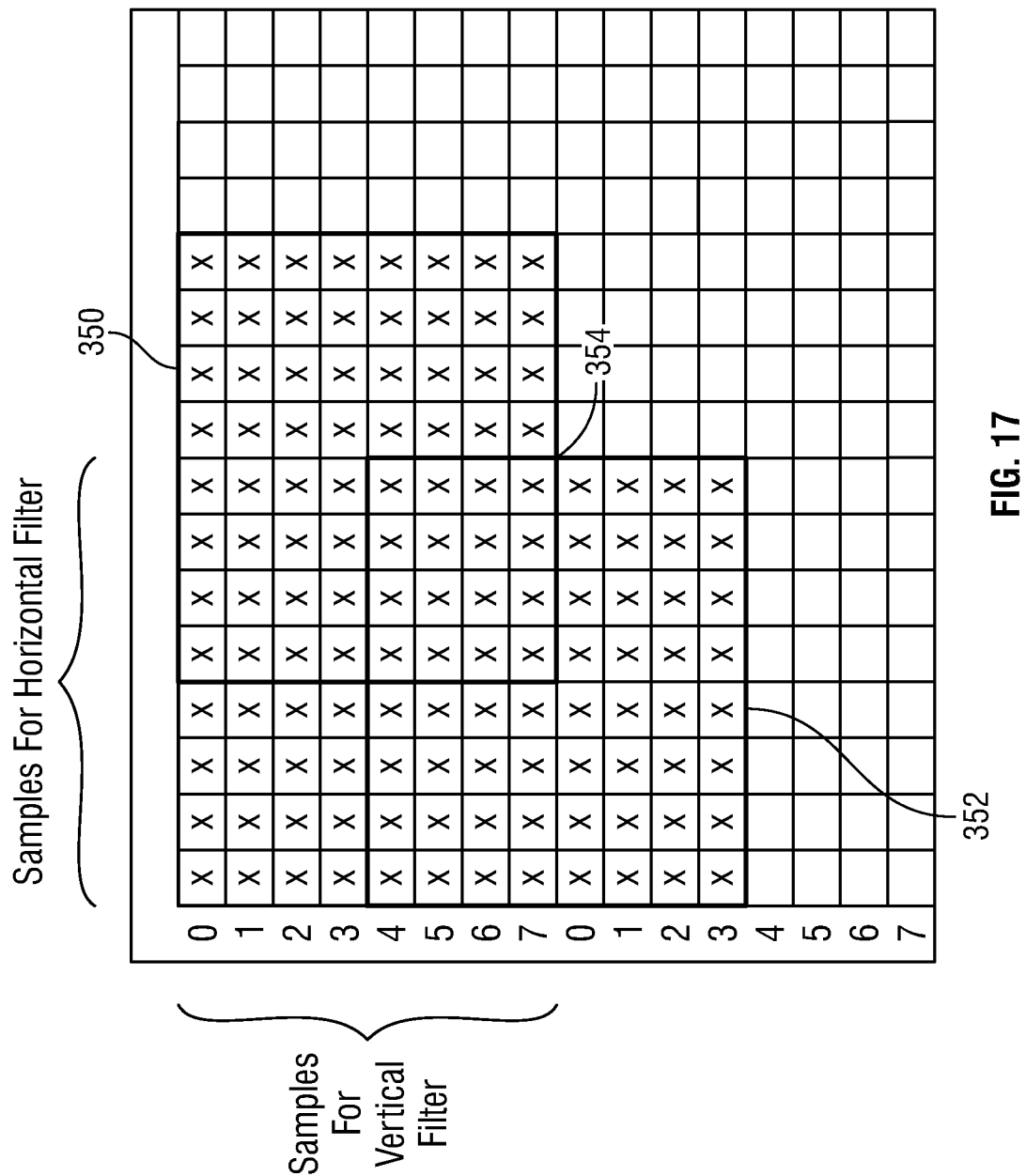
FIG. 17 shows horizontal and vertical filtering in a deblocking process for an 8×8 aligned edge within a CTB sized 64×64.

Turning first to the de-blocking process, in HEVC this process is divided into two major blocks, boundary strength computation and filtering. Both these are performed for all the edges which are aligned to 8×8 boundaries. In the filtering stage, all vertical edges are first filtered followed by the horizontal edges. This process modifies up-to three samples on either side of the edge. FIG. 17 shows horizontal and vertical filtering processes for an 8×8 aligned edge within a CTB sized 64×64. Samples 350 are required for horizontal filtering for a vertical edge and samples 352 are required for vertical filtering for a horizontal edge. Samples 354 are the samples which are modified by both the filters.

The HEVC standard mandates that the horizontal filtering should be completed before performing the vertical filtering. De-blocking is applied to all the block edges to reduce the artifacts across block boundaries. In HEVC filtering is applied across transform block edges as well as prediction blocks edges. The prediction blocks and the transform blocks can be of different sizes and de-blocking is used to smooth the edges for both these boundaries.

SAO is one of the new features introduced in the HEVC standard to reduce the noise introduced due to compression. This filtering is done after de-blocking. As part of filtering process an offset is conditionally added to all the decoded samples. For every CTB a filter mode and four amplitude offset values are transmitted within the bit-stream. Filtering is performed in two modes, edge offset mode and band offset. In band offset mode, the offset to be added is based on the sample amplitude value. In this mode all the sample values are categorized into one of the 32 bands and an offset is associated with each band. A band index and four offset values for four consecutive bands from the band index are transmitted. In edge offset mode an edge mode varying from 0 to 3 indicating the directional (horizontal, vertical, or diagonal) gradient is used for determining edge offsets. Neighboring samples around each 3×3 grid in a specified mode are compared and based on the comparison results one of the four offsets is used to modify the pixel values.

In accordance with one aspect of the subject matter disclosed herein, a mechanism is provided to parallelize de-blocking and SAO across multiple cores. In accordance with this mechanism, once the decoding of a frame is completed using one or more of the parallelization schemes described in the sections above, de-blocking and SAO filtering may be applied to the whole frame, one CTB at a time.

Figure 18:
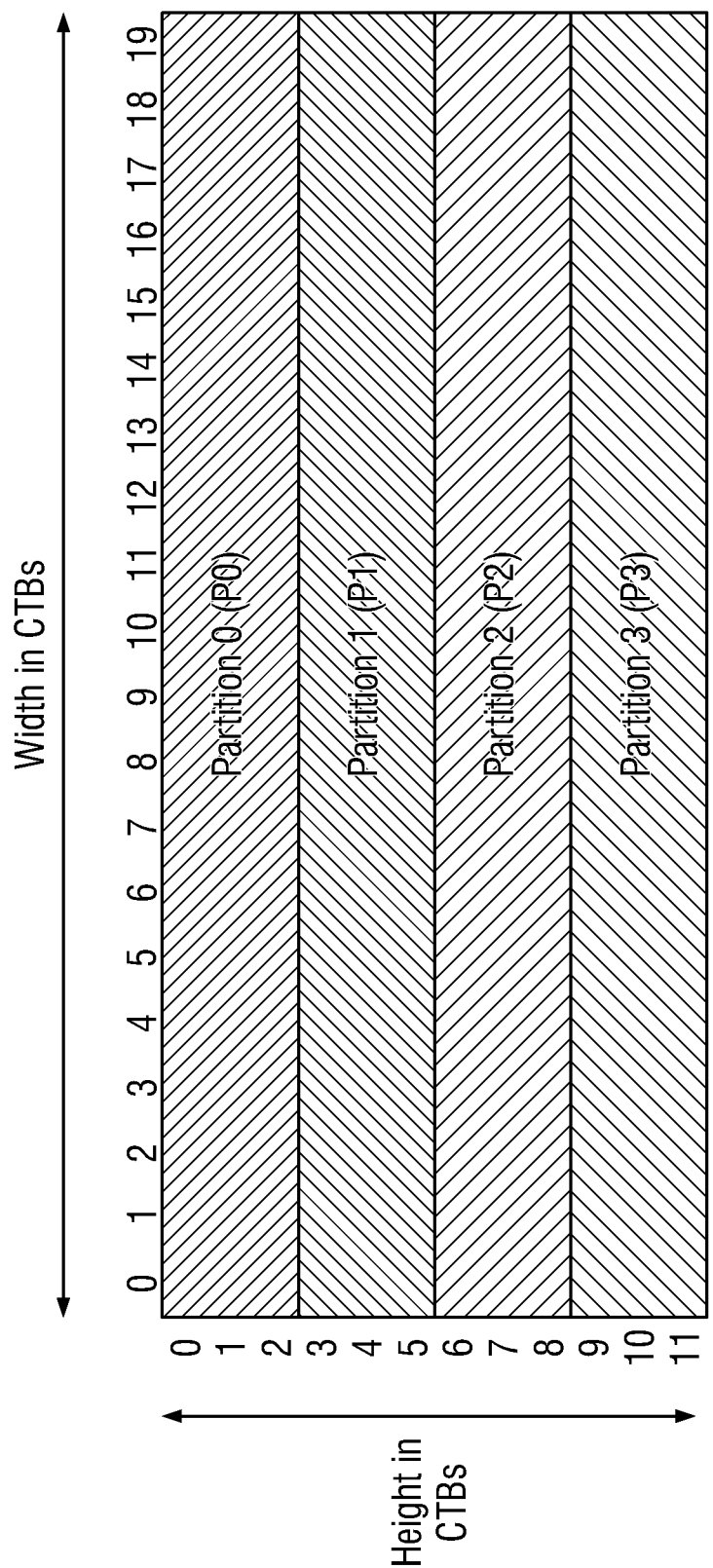
FIG. 18 depicts partitioning of a frame having a resolution of 720p for a processor platform that has four cores.

More specifically, the whole frame is first partitioned into equal sized partitions based on the number of cores present on the platform. For example if the number of cores available is four, then the whole frame is partitioned into four equal sized partitions. Once the frame is divided, each partition is dispatched for processing. De-blocking and SAO filtering is applied for each partition one CTB at a time. FIG. 18 depicts partitioning of a frame having a resolution of 720p for a processor platform that has four cores. The frame is divided into partitions containing equal number of rows of CTBs. In the example of FIG. 18 for a frame of size 1280×720 and a CTB of size 64×64, each partition will have approximately three rows of CTBs.

Figure 19:
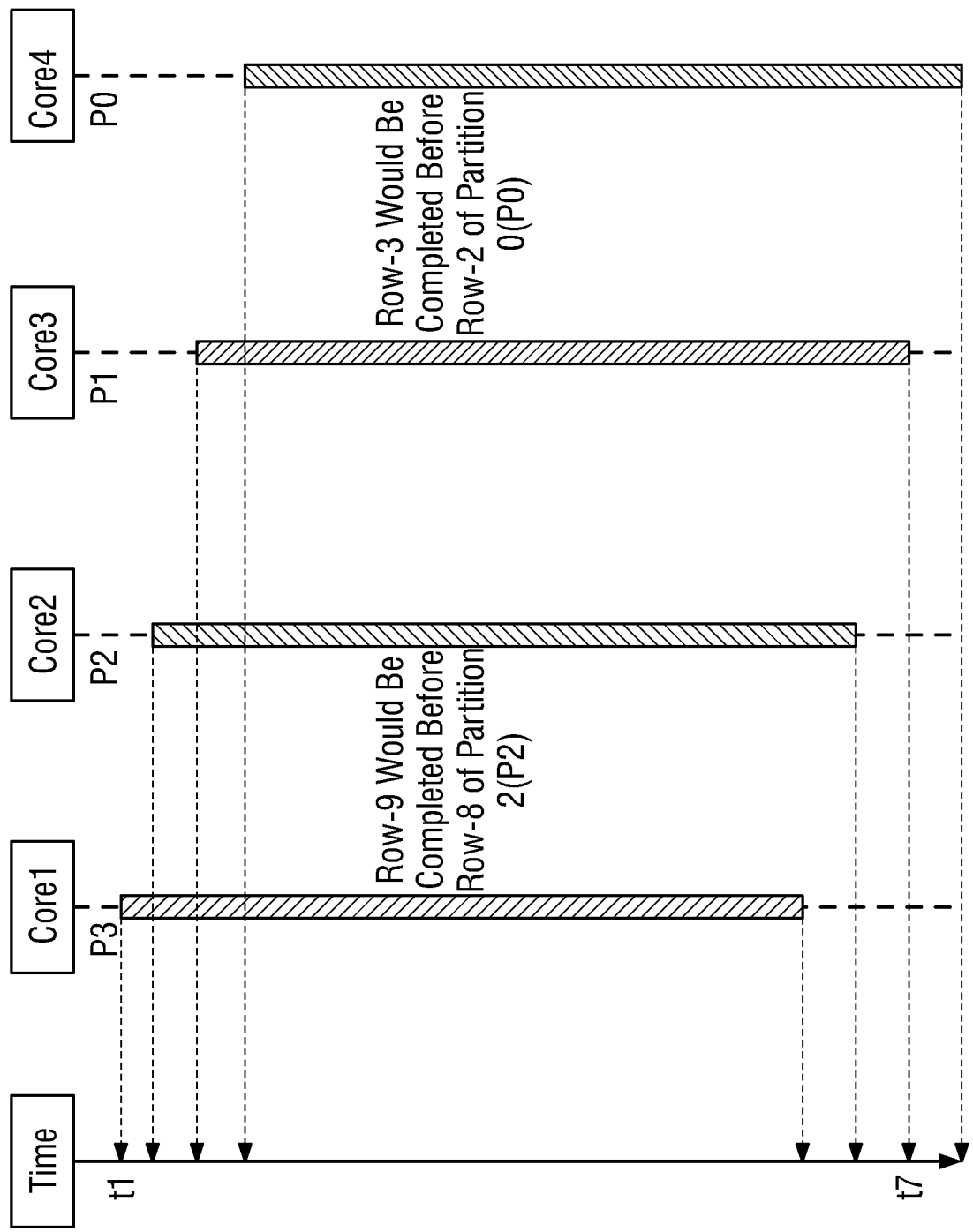
FIG. 19 is a sequence/timing diagram showing the execution and dispatch sequence for the frame partitions shown in FIG. 18.

FIG. 19 is a sequence/timing diagram showing the execution and dispatch sequence for the frame partitions shown in FIG. 18. As shown, partition P3 is first dispatched to core 1, followed in sequence by dispatching partition P2 to core 2, partition P1 to core 3 and partition P0 to core 4. From the dispatch sequence it can be noted that the required data for vertical filtering across the partition edges is available when the CTBs in the last row of the partition begins processing. Specifically, the sequence diagram illustrates that row 9 from partition P3 is completed before row 8 of partition P2 is initiated. This ensures that samples for vertical filtering are available. Similarly the dispatch sequence of partition P1 followed by partition P0 ensures that all the necessary samples are available. Dispatching the partitions in this specific sequence ensures that the dependent data is available for vertical filtering with zero wait time and ensures that all the cores are efficiently utilized. The execution process includes vertical filtering, followed by horizontal filtering and SAO filtering processes.

The technique described above for parallel processing de-blocking and SAO provides a number of advantages over conventional parallel processing de-blocking techniques such as those described in the paper "Comparison of Different Parallel Implementations for De-blocking filter of HEVC," Anand Meher Kotra, Mickael Raulet, Olivier Deforges." One technique discussed in this reference involves dispatching multiple rows of CTBs to a core and waiting for the dependent samples to be available to perform horizontal edge filtering. Among the advantages of the technique described herein are the following.

First, since both in-loop filters are processed for every CTB all the pixel values for the current CTB are available in the cache memory, which leads to reduced cache misses, as compared to a conventional mechanism in which SAO is followed by de-blocking at the frame level, i.e, de-blocking for the whole frame is completed and then SAO is applied to that frame. In this conventional method the pixel data has to be flushed and reloaded twice for both the filtering operations. Cache misses are directly proportional to the frame resolution.

In the reference cited above, all of the vertical edge filtering for the whole frame is distributed across the available cores, followed by horizontal edge filtering. Accordingly, the pixel data in the cache is not optimally used since the same data gets reloaded to execute horizontal edge filtering.

Also in the reference cited above, the whole frame is divided into approximately an equal number of rows (CTB rows) based on the number of cores available. As a result a wait time is incurred. This wait time is due to the dependent data that is required across partitions. In contrast, the technique described herein removes the incurred wait time by dispatching the partitions in specific order shown FIG. 19. Moreover, by dividing the frame into partitions as explained above and applying both in loop filtering processes on these relatively large partitions, dispatch overhead is reduced.

Rule-Based Code Partitioning for HEVC Decoding

In order to schedule the decoding tasks in a stream-aware manner, a rule based framework may be useful to define the relative priorities of the various scheduling methods. Table 2 below summarizes how the scheduling method described above may be prioritized based on the parallel constructs available in the video bitstream. The terms "Rule Antecedent" and "Rule Consequent" as used in Table 2 have the following connotation. In the conditional p→q (or synonymously if p then q), the if-clause p is called the antecedent. The then-clause q is called the consequent.

TABLE 2

Prioritization based on the parallel constructs in the bitstream

| Rule Antecedent | Rule Consequent | Comments |
| --- | --- | --- |
| Tiles exist in bitstream. The number of tiles is greater than or equal to the number of cores | 1. Group tiles of approximately equal sizes 2. Schedule decoding of tiles belonging to the same group concurrently, factoring in number of parallel cores available | Tiles have entry points in terms of byte offsets readily specified in the bisream. This rule load-balances tiles, especially when tiles are of varying sizes (in terms of number of compressed bytes) tiles may be grouped such that all groups have approximately equal number of bytes to facilitate load balancing. |
| Tiles exist and the number of cores (Nc) is greater than the number of tiles (Nt) | 1. Schedule the largest of the (Nc-Nt) tiles to run using atomic parallelization so as to use 2 cores each. 2. Schedule the remaining tiles to run on single cores. | |
| No tiles in stream, but wavefronts exist in the bitstream. The number of cores is 2. | 1. Dispatch decoding of next row after first two CTBs of current row has been decoded. | |
| No tiles, but wavefronts exist in the bitstream. The number of cores is greater than 2. | 1. Schedule based on tiles. | Since tiles are more macroscopic in nature, dispatch overheads are fewer. |
| No tiles, no wavefronts | Use Atomic parallelization 1. Partition the decoding tasks to best-fit the load-balance possible currently 2. Use appropriate code partitioning scheme based on bits per block (e.g. CTB) | Based on analysis, a threshold is used to decide which method of scheduling to use, depending on the instantaneous value of bits per block (e.g. CTB) |

Parallelization in Video Coding Standards Other than HEVC

The techniques described herein are not limited in applicability to the HEVC standard. Moreover, some aspects of these techniques are particularly applicable to earlier video decoding standards such as H264. Illustrative examples are presented below.

In one example, the atomic parallelization scheme described above, along with the dynamic scheduling as also described above, may be employed in H.264. In H.264 the atomic level parallelization can be applied at macro-block level. The decoding functions (used by atomic parallelization scheme to process in parallel) are the same as described above, or alternatively, equivalents can be identified for H.264.

In another example, slices in H.264 can be used as a parallelization construct at a macroscopic-level, analogous to the use of tiles as described above. In yet another example, the benefits arising from the use of de-blocking parallelization as described above for HEVC can also be applied to H.264.

Illustrative Multi-Core Platform

Figure 20:
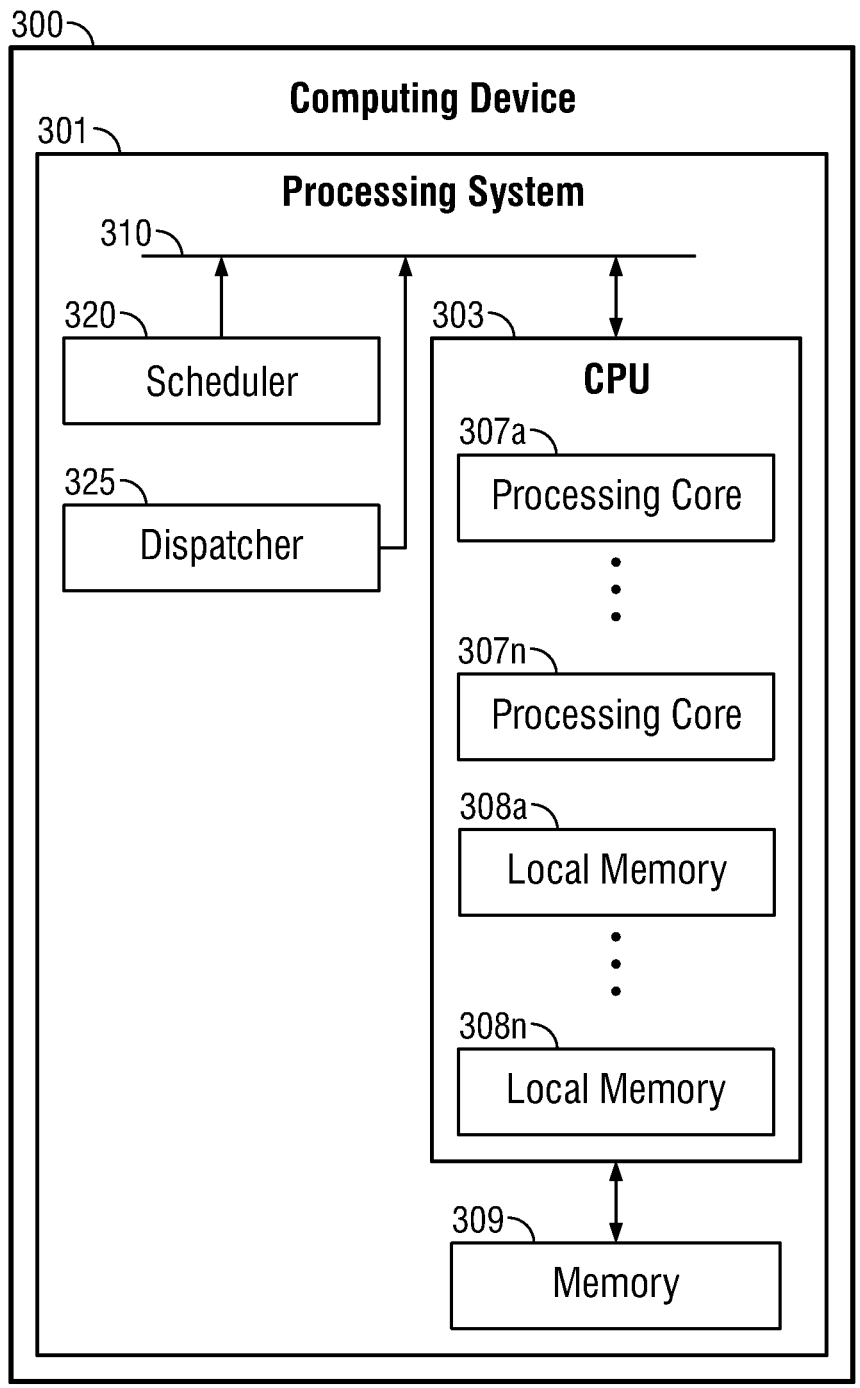
FIG. 20 illustrates a block diagram of a computing device including a central processing unit.

The subject matter described herein may be implemented in any computing environment that is capable of executing operations in parallel simultaneously. FIG. 20 illustrates a block diagram of a computing device 301 including a central processing unit 303. The CPU 303 is associated with memory 309 which may include volatile and non-volatile memory for storing instructions and data to be operated on. The CPU 303 is associated with memory 309, which may also include volatile and non-volatile memory for storing instructions and data to be operated on.

The CPU 303 includes multiple processing cores 307a to 307n configured to operate in parallel. Each processing core 307a to 307n may further be associated with dedicated local memory 308a to 308n for that particular processing core. The processing cores 307a to 307n may simultaneously run separate threads, and in some embodiments each processing core 307a to 307n runs multiple threads simultaneously. In embodiments of the invention, the multiple processing cores 307a to 307n simultaneously perform various video decoding functions as described above.

The processing system 301 further includes a bus 310 for facilitating communications between the CPU 303 and other components of the processing system 301 and external devices, such as transmitters, receivers, additional computing devices, or any other devices capable of transmitting or receiving data.

The processing system 301 also includes a scheduler 320 and dispatcher 325 that communicates with CPU 303 over bus 310. The scheduler 320 schedules the various decoding functions onto the processing cores of the CPU 303 in accordance with the techniques described herein. The dispatcher 325 then dispatches the decoding functions to the processing cores in accordance with the schedule established by the scheduler 320.

Aspects of the subject matter described herein are operational with numerous general purpose or special purpose computing system environments or configurations that employ dual or multi-core processors. Examples of well-known computing systems, environments, or configurations that may be suitable for use with aspects of the subject matter described herein comprise personal computers, server computers, hand-held or laptop devices, multiprocessor systems, microcontroller-based systems, set-top boxes, programmable consumer electronics, network PCs, minicomputers, mainframe computers, personal digital assistants (PDAs), gaming devices, printers, appliances including set-top, media center, or other appliances, automobile-embedded or attached computing devices, other mobile devices, distributed computing environments that include any of the above systems or devices, and the like.

Aspects of the subject matter described herein may be described in the general context of computer-executable instructions, such as program modules or components, being executed by a computer. Generally, program modules or components include routines, programs, objects, data structures, and so forth, which perform particular tasks or implement particular data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Figure 21:
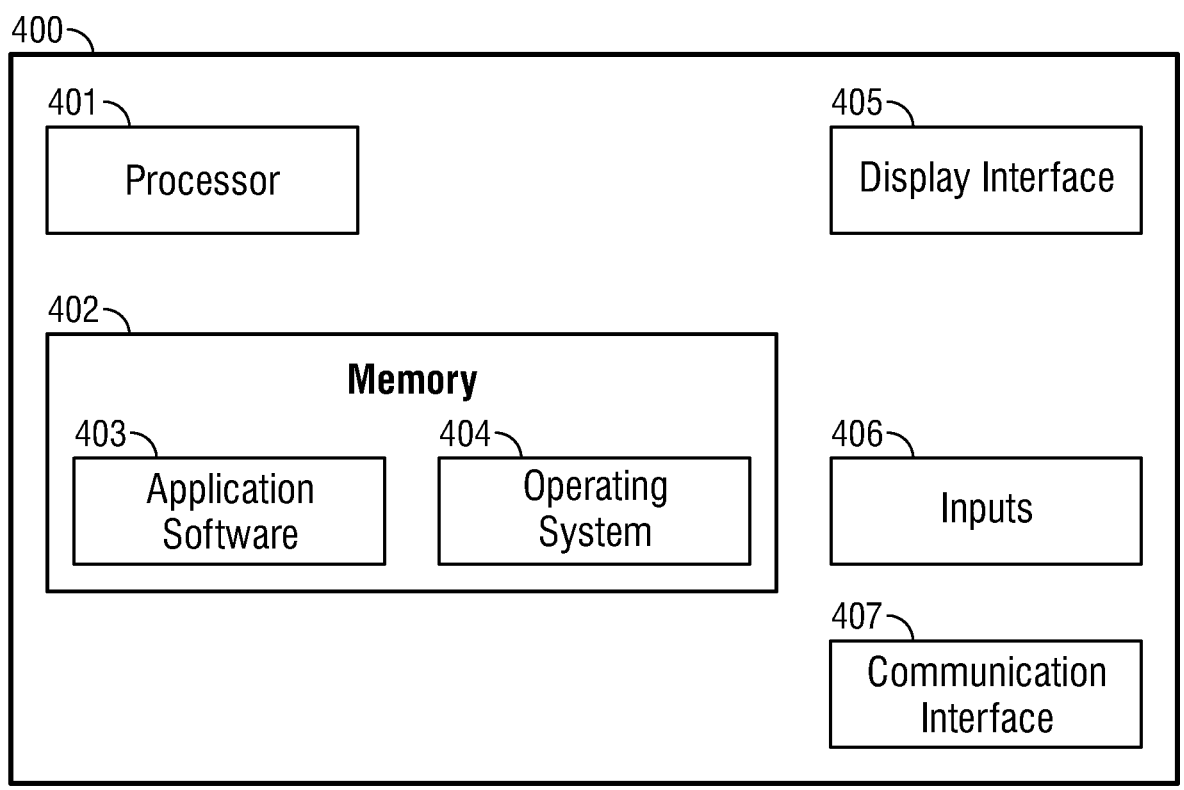
FIG. 21 illustrates various components of an illustrative computing-based device.

FIG. 21 illustrates various components of an illustrative computing-based device 400 which may be implemented as any form of a computing and/or electronic device, and in which embodiments of a server and/or a client as described above may be implemented.

The computing-based device 400 comprises one or more inputs 406 which are of any suitable type for receiving media content, Internet Protocol (IP) input, activity tags, activity state information, resources or other input. The device also comprises communication interface 407 to enable the device to communicate with one or more other entity using any suitable communications medium.

Computing-based device 400 also comprises one or more dual or multi-core processors 401 which may be microprocessors, controllers or any other suitable type of processors for processing computing executable instructions to control the operation of the device in order to decode video streams. Platform software comprising an operating system 404 or any other suitable platform software may be provided at the computing-based device to enable application software 403 to be executed on the device.

The computer executable instructions may be provided using any computer-readable media, such as memory 402. The memory is of any suitable type such as random access memory (RAM), a disk storage device of any type such as a magnetic or optical storage device, a hard disk drive, or a CD, DVD or other disc drive. Flash memory, EPROM or EEPROM may also be used.

An output is also provided such as an audio and/or video output to a display system integral with or in communication with the computing-based device. A display interface 405 is provided to control a display device to be used in conjunction with the computing device. The display system may provide a graphical user interface, or other user interface of any suitable type.

As disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices, or other computer-readable storage media for storing information. The term "computer-readable storage medium" includes, but is not limited to, portable or fixed storage devices, optical storage devices, wireless channels, a SIM card, other smart cards, and various other mediums capable of storing, containing, or carrying instructions or data. However, computer readable storage media do not include transitory forms of storage such as propagating signals, for example.

Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable storage medium and executed by one or more processors.

Although the subject matter has been described in language specific to structural features and/or methodological acts, it is to be understood that the subject matter defined in the appended claims is not necessarily limited to the specific features or acts described above. Rather, the specific features and acts described are disclosed as example forms of implementing the claims.

The invention claimed is:

1. A method of decoding an encoded video stream on a processor having a plurality of processing cores, comprising:

receiving the encoded video stream;

examining the video stream to identify any macroscopic constructs present therein that support parallel processing and bit rate to determine a threshold that is used for further determining the manner of parallel processing of said video stream, wherein the threshold is derived by determining a time taken for Context Adaptive Binary Arithmetic Coding (CABAC) processing relative to a time taken for decoding remaining parts of the video stream;

dividing decoding of the video stream into a plurality of decoding functions;

scheduling the plurality of decoding functions for decoding the video stream in a dynamic manner based on availability of any macroscopic constructs that have been identified and then based on a number of bytes used to encode each block into which each picture of the video stream is partitioned among the plurality of processing cores; and dispatching each of the decoding functions to the plurality of processing cores in accordance with the scheduling.

2. The method of claim 1, wherein the scheduling based on the availability of any macroscopic-constructs includes scheduling based on availability of a prioritized list of macroscopic functions.

3. The method of claim 2, wherein the prioritized list of macroscopic functions, from highest priority to lowest priority, includes tiles, wavefronts and slices within each picture.

4. The method of claim 1, wherein the video stream includes tiles and the scheduling includes grouping tiles into different sets and scheduling decoding of each set of tiles on a different core.

5. The method of claim 4, wherein each set of tiles has a total number of bytes that are as equal to one another as possible.

6. The method of claim 1, wherein the video stream includes a number of tiles and the number of tiles is less than a number of cores that are available, and further comprising scheduling decoding of each tile across at least two cores.

7. The method of claim 1, wherein the plurality of decoding functions includes a plurality of atomic decoding functions, the plurality of atomic decoding functions including all of the plurality of decoding functions exclusive of decoding functions applicable to macroscopic constructs, and further comprising scheduling the atomic decoding functions based on the number of bytes used to encode each block into which each picture of the video stream is partitioned.

8. The method of claim 7, wherein a threshold number of bytes used to encode each block is used to schedule the atomic decoding functions to be dispatched to different cores.

9. The method of claim 7, wherein said atomic functions include CABAC decoding, a remaining part of luma video decoding exclusive of CABAC and in-loop filtering of luma blocks and a remaining part of chroma video decoding exclusive of CABAC and in-loop filtering of chroma blocks.

10. The method of claim 8, wherein said atomic functions include CABAC decoding, a remaining part of luma video decoding exclusive of CABAC and in-loop filtering of luma blocks and a remaining part of chroma video decoding exclusive of CABAC and in-loop filtering of chroma blocks and, if the threshold number of bytes is exceeded, scheduling the remaining parts of luma video coding exclusive of CABAC and in-loop filtering of luma blocks and chroma decoding exclusive of CABAC and in-loop filtering of chroma blocks to a different core from that on which CABAC decoding is performed.

11. The method of claim 8, wherein said atomic functions include CABAC decoding, a remaining part of luma video decoding exclusive of CABAC and in-loop filtering of luma blocks and a remaining part of chroma video decoding exclusive of CABAC and in-loop filtering of chroma blocks and, if the threshold number of bytes is exceeded, scheduling only one of (1) the remaining part of luma video coding exclusive of CABAC and in-loop filtering of luma blocks and (2) the remaining part of chroma decoding exclusive of CABAC and in-loop filtering of chroma blocks to a different core from that on which CABAC decoding is performed.

12. The method of claim 6, wherein the plurality of decoding functions includes a plurality of atomic decoding functions, the plurality of atomic decoding functions including all of the plurality of decoding functions exclusive of decoding functions applicable to macroscopic constructs, the scheduling of the decoding of each tile across at least two cores further comprising scheduling one or more atomic decoding functions on one core and remaining ones of the plurality of atomic decoding functions on at least one other core.

13. The method of claim 7, wherein a number of available cores exceeds a number of macroscopic constructs that have been identified, and further comprising scheduling decoding of at least one of the identified macroscopic constructs across at least two cores such that one or more atomic decoding functions are to be performed on one core and remaining ones of the plurality of atomic decoding functions are to be performed on at least one other core.

14. The method of claim 1, wherein the blocks into which the pictures are partitioned are a CTB, a CB or a superblock.

* * * * *